(12) United States Patent
Heroux et al.

(10) Patent No.: US 10,514,498 B2
(45) Date of Patent: *Dec. 24, 2019

(54) WAVEGUIDE ARCHITECTURE FOR PHOTONIC NEURAL COMPONENT

(71) Applicant: INTERNATIONAL BUSINESS MACHINES CORPORATION, Armonk, NY (US)

(72) Inventors: Jean Benoit Heroux, Tokyo (JP); Seiji Takeda, Tokyo (JP); Toshiyuki Yamane, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,661

(22) Filed: Apr. 10, 2019

(65) Prior Publication Data

US 2019/0235165 A1    Aug. 1, 2019

Related U.S. Application Data

(63) Continuation of application No. 16/108,328, filed on Aug. 22, 2018, now Pat. No. 10,353,145, which is a
(Continued)

(51) Int. Cl.
*G02B 6/12* (2006.01)
*H04B 10/80* (2013.01)
(Continued)

(52) U.S. Cl.
CPC ......... *G02B 6/12004* (2013.01); *G02B 6/125* (2013.01); *H04B 10/50* (2013.01);
(Continued)

(58) Field of Classification Search
CPC ............. G02B 6/12004; G02B 6/125; G02B 2006/12123; G02B 2006/12104; G02B 2006/12109; H04B 10/50
(Continued)

(56) References Cited

U.S. PATENT DOCUMENTS

| 5,054,873 A | 10/1991 | Davis et al. |
| 6,694,073 B2 * | 2/2004 | Golub .................... G02B 6/266 385/18 |

(Continued)

FOREIGN PATENT DOCUMENTS

| CN | 101034942 A | 9/2007 |
| CN | 104422990 A | 3/2015 |
| JP | H09160895 A | 6/1997 |

OTHER PUBLICATIONS

Bamiedakis et al., "Low Loss and Low Crosstalk Multimode Polymer Waveguide Crossings for High-Speed Optical Interconnects", 2007 Conference on Laser and Electro-Optics. May 6-11, 2007. pp. 1-2.

(Continued)

*Primary Examiner* — Juan A Torres
(74) *Attorney, Agent, or Firm* — Tutunjian & Bitetto, P.C.; Vazken Alexanian

(57) ABSTRACT

A photonic neural component includes optical transmitters, optical receivers, inter-node waveguides formed on a board, transmitting waveguides configured to receive optical signals emitted from the optical transmitters and transmit the received optical signals to the inter-node waveguides, mirrors to partially reflect optical signals propagating on the inter-node waveguides, receiving waveguides configured to receive reflected optical signals produced by the mirrors and transmit the reflected optical signals to the optical receivers, and filters configured to apply weights to the reflected optical signals. The transmitting waveguides and receiving
(Continued)

waveguides are formed on the board such that one of the transmitting waveguides and one of the receiving waveguides crosses one of the inter-node waveguides with a core of one of the crossing waveguides passing through a core or clad of the other.

20 Claims, 11 Drawing Sheets

Related U.S. Application Data continuation of application No. 15/422,533, filed on Feb. 2, 2017, now Pat. No. 10,107,959.

(51) Int. Cl.
*H04B 10/50* (2013.01)
*G02B 6/125* (2006.01)

(52) U.S. Cl.
CPC . *H04B 10/801* (2013.01); *G02B 2006/12104* (2013.01); *G02B 2006/12109* (2013.01); *G02B 2006/12123* (2013.01)

(58) Field of Classification Search
USPC .......................................................... 398/200
See application file for complete search history.

(56) References Cited

U.S. PATENT DOCUMENTS

| | | | |
|---|---|---|---|
| 9,082,075 B1 | 7/2015 | Cruz-Albrecht et al. | |
| 9,111,225 B2 | 8/2015 | Hunzinger et al. | |
| 9,171,249 B2 | 10/2015 | Lazar et al. | |
| 10,031,287 B1 | 7/2018 | Heroux et al. | |
| 2002/0071627 A1* | 6/2002 | Smith .................... | G02B 6/266 385/15 |
| 2006/0216030 A1 | 9/2006 | Kim et al. | |
| 2007/0297802 A1 | 12/2007 | Uchiyama et al. | |
| 2008/0008471 A1* | 1/2008 | Dress .................... | G06E 3/006 398/66 |
| 2011/0158653 A1 | 6/2011 | Mazed | |
| 2011/0268386 A1 | 11/2011 | Morris et al. | |
| 2013/0101256 A1 | 4/2013 | Heroux et al. | |
| 2014/0264400 A1 | 9/2014 | Lipson et al. | |
| 2014/0324747 A1 | 10/2014 | Crowder et al. | |
| 2015/0131991 A1* | 5/2015 | Hattori .................. | H04J 4/0212 398/47 |
| 2017/0302396 A1 | 10/2017 | Tait et al. | |

OTHER PUBLICATIONS

Fok et al., "Asynchronous spiking photonic neuron for lighwave neuromorphic signal processing", Optics Letters, vol. 37, Issue 16. Aug. 15, 2012. pp. 3309-3311.

Nahmias et al., "Demonstration of an O/E/O Receiverless Link in an Integrated Multi-Channel Laser Neuron", 2016 Conference on Laser and Electro-Optics. Jun. 5-10, 2016. pp. 1-2.

Shastri et al., "Photonic Spike Processing: Ultrafast Laser Neurons and an Integrated Photonic Network", IEEE Photonics Society Newsletter, vol. 23, No. 3. Jun. 1, 2011. pp. 1-11.

Tait et al., "Broadcast and Weight: An Integrated Network for Scalable Photonic Spike Processing", Journal of Lightwave Technology, vol. 32, No. 21. Nov. 1, 2014. pp. 4029-4041.

Vandoorne et al., "Experimental demonstration of reservoir computing on a silicon photonics chip", Nature Communications. Article No. 3541. Mar. 24, 2014. pp. 1-6.

Wang et al., "General optoelectronic computing based on scalable photonic neuromorphic system", 2016 Conference on Lasers and Electro-Optics. Jun. 5-10, 2016. pp. 1-2.

Nahmias et al., "An integrated analog O/E/O link for multi-channel laser neurons". Applied Physics Letters, vol. 108, Issue 15. Apr. 14, 2016. pp. 1-5.

International Search Report issued in PCT/IB2018/050556 dated Apr. 28, 2018, 9 pages.

International Search Report Issued in PCT/IB2018/050078 dated Apr. 28, 2018, 10 pages.

List of IBM Patents or Patent Applications Treated as Related dated Apr. 10, 2019, 2 pages.

United Kingdom Office Action issued on related Application No. GB1911914.8 dated Sep. 17, 2019, 5 pages.

United Kingdom Office Action issued on related Application No. GB1910617.8 dated Sep. 17, 2019, 3 pages.

* cited by examiner

WAVEGUIDE ARCHITECTURE FOR PHOTONIC NEURAL COMPONENT

BACKGROUND

Technical Field

The present invention generally relates to a waveguide architecture for a photonic neural component, and more particularly to a waveguide architecture for e.g., a photonic neural component of a neural network.

Related Art

Non-traditional, neuromorphic computing architectures such as neural networks and reservoir computing have shown promise in terms of performance, but conventional electronic approaches to interconnecting neurons have met with some limitations. For example, the IBM TrueNorth system operates with a processing speed in the kHz range due to the need for time multiplexing. Recently, excitable opto-electronics devices have generated interest as a way of potentially lifting this speed limitation. (See, for example, A. N., Tait et al., "Broadcast and Weight: An Integrated Network For Scalable Photonic Spike Processing," J. Light. Tech. 32, 3427, 2014, M. A. Nahmias et al., "An integrated analog O/E/O link for multi-channel laser neurons," Appl. Phys. Lett. 108, 151106 (2016), and K. Vandoorne et al., "Experimental demonstration of reservoir computing on a silicon photonics chip," Nature Communication 5, 3541, 2014). However, such attempts have been limited by very high power consumption and optical loss. Meanwhile, the fabrication of waveguide crossing structures with very low loss has recently become possible. (See, for example, N. Bamiedakis et al., "Low Loss and Low Crosstalk Multimode Polymer Waveguide Crossings for High-Speed Optical Interconnects," 2007 Conference on Lasers and Electro-Optics (CLEO), CMG1).

SUMMARY

In accordance with an embodiment of the present invention, a photonic neural component capable of overcoming the above drawbacks accompanying the related art is provided. The photonic neural component includes a plurality of optical transmitters, a plurality of optical receivers, a plurality of inter-node waveguides formed on a board, a plurality of transmitting waveguides formed on the board such that at least one of the transmitting waveguides crosses at least one of the inter-node waveguides with a core of one of the crossing waveguides passing through a core or a clad of the other, each transmitting waveguide optically connected to an optical transmitter of the plurality of optical transmitters and configured to receive an optical signal emitted from the optical transmitter and transmit the received optical signal to an inter-node waveguide of the plurality of inter-node waveguides, a plurality of mirrors formed on the board, each mirror to partially reflect an optical signal propagating on an inter-node waveguide of the plurality of inter-node waveguides to provide a reflected optical signal, a plurality of receiving waveguides formed on the board such that at least one of the receiving waveguides crosses at least one of the inter-node waveguides with a core of one of the crossing waveguides passing through a core or a clad of the other, each receiving waveguide optically connected to an optical receiver of the plurality of optical receivers and configured to receive a reflected optical signal produced by a mirror of the plurality of mirrors and transmit the reflected optical signal to the optical receiver, and a plurality of filters formed on the board, each filter configured to apply a weight to a reflected optical signal produced by a mirror of the plurality of mirrors before the reflected optical signal is transmitted to an optical receiver by the receiving waveguide that receives the reflected optical signal. The photonic neural component may support design flexibility while lifting the speed restriction of the conventional electronic approach.

In accordance with an embodiment of the present invention, the plurality of optical transmitters may include two or more optical transmitters that emit optical signals at the same wavelength, and the plurality of inter-node waveguides may include an inter-node waveguide dedicated to each of the two or more optical transmitters. The plurality of filters may include a neutral density filter. The photonic neural component may support the design of a simple structure without the need for wavelength division multiplexing (WDM) of optical signals on the inter-node waveguides.

In accordance with an embodiment of the present invention, the photonic neural component may further include a plurality of combiners formed on the board, each combiner configured to optically add an input optical signal to an optical signal propagating on a receiving waveguide of the plurality of receiving waveguides. An optical signal propagating on each of the receiving waveguides may be optically added to an optical signal propagating on another of the receiving waveguides via a combiner of the plurality of combiners while being transmitted to the optical receiver to which the receiving waveguide is connected, the optical addition occurring after a weight has been applied by an optical filter of the plurality of optical filters. The plurality of combiners may include a combiner having a y-shaped waveguide structure connected by a first entrance arm and an exit arm to a first receiving waveguide of the plurality of waveguides, the combiner configured to receive, as the input signal, an optical signal propagating on a second receiving waveguide of the plurality of receiving waveguides such that the input signal enters a second entrance arm of the y-shaped waveguide structure and joins an optical signal propagating on the first receiving waveguide where the second entrance arm meets the first entrance arm of the y-shaped waveguide structure. The photonic neural component may support weighted addition or fan-in of optical signals on the receiving waveguides, reducing the number of optical receivers necessary.

In accordance with an embodiment of the present invention, the plurality of filters may include an exchangeable filter that can be exchanged to change the applied weight. The photonic neural component may support tuning of a neural network comprising the photonic neural component.

In accordance with an embodiment of the present invention, the plurality of filters may include a variable filter whose transparency can be varied to change the applied weight. The photonic neural component may support tuning of a neural network comprising the photonic neural component.

In accordance with an embodiment of the present invention, the photonic neural component may further include a plurality of semiconductor chips mounted on the board, each of the semiconductor chips including at least one of the optical transmitters or at least one of the optical receivers. The photonic neural component may further support design flexibility.

In accordance with an embodiment of the present invention, the plurality of semiconductor chips may include optical transmitter chips and optical receiver chips, each of the optical transmitter chips including one or more of the optical transmitters and each of the optical receiver chips including one or more of the optical receivers, and the optical transmitter chips may include a first optical transmitter chip whose one or more optical transmitters emit optical signals at a first wavelength and a second optical transmitter chip whose one or more optical transmitters emit optical signals at the first wavelength. Each of the optical transmitter chips may include the same number of optical transmitters, each of the optical receiver chips may include the same number of optical receivers, the number of optical transmitters included in each of the optical transmitter chips may be the same as the number of optical receivers included in each of the optical receiver chips, and the number of inter-node waveguides connected to each of the optical transmitter chips via the transmitting waveguides may be the same as the number of optical transmitters included in each of the optical transmitter chips and the number of optical receivers included in each of the optical receiver chips. The photonic neural component may support the design of a simple structure without the need for wavelength multiplexing of optical signals on the inter-node waveguides or for complex spectral filters that may be costly.

In accordance with an embodiment of the present invention, each of the semiconductor chips can be arranged such that the at least one optical transmitter included in the chip or the at least one optical receiver included in the chip faces the board, the transmitting waveguides can be connected to the optical transmitters via entry mirrors arranged to redirect light from a direction perpendicular to the board to a direction parallel to the board, and the receiving waveguides may be connected to the optical receivers via exit mirrors arranged to redirect the light from a direction parallel to the board to a direction perpendicular to the board. The photonic neural component may further support design flexibility by supporting the use of waveguides formed on the board.

In accordance with an embodiment of the present invention, the photonic neural component further includes a plurality of intra-node signal lines, each intra-node signal line connected to an optical receiver of the plurality of optical receivers and an optical transmitter of the plurality of optical transmitters and configured to receive an electrical signal representing a power of an optical signal received by the optical receiver and transmit the electrical signal to the optical transmitter, thereby connecting the optical receiver and the optical transmitter to form an input and an output of a neuron. For each of the optical receivers connected to an optical transmitter via an intra-node signal line, the plurality of mirrors include a mirror whose reflected optical signal is transmitted to the optical receiver and whose reflection coefficient is substantially zero for a wavelength of the optical signal emitted by the optical transmitter. The photonic neural component may support functionality of the photonic neural component as a neural network or portion thereof.

In accordance with an embodiment of the present invention, the inter-node waveguides, the transmitting waveguides, and the receiving waveguides may be made of polymer in a single layer of the board. The photonic neural component may support design flexibility while reducing optical loss.

In accordance with an embodiment of the present invention, the plurality of optical transmitters are divided into differential pairs in which one of the optical transmitters of a differential pair emits a variable optical signal while the other of the optical transmitters of the differential pair emits a reference optical signal. The photonic neural component may further include a plurality of semiconductor chips mounted on the board, each of the semiconductor chips including one or more of the differential pairs. Each of the semiconductor chips may include two or more of the differential pairs. The photonic neural component may support functionality of the photonic neural component as a neural network or portion thereof.

In accordance with an embodiment of the present invention, the plurality of inter-node waveguides include a first ring having two or more of the inter-node waveguides arranged as concentric loops, the plurality of optical transmitters may include a first inner optical transmitter group having two or more of the optical transmitters disposed inside the first ring, and the plurality of optical receivers may include a first inner optical receiver group having two or more of the optical receivers disposed inside the first ring. The photonic neural component may support input/output functionality and expandability of the photonic neural component as a neural network or portion thereof.

In accordance with an embodiment of the present invention, the plurality of mirrors may include a first mirror group, each mirror of the first mirror group arranged to partially reflect an optical signal propagating on an inter-node waveguide of the first ring to provide a reflected optical signal, and the photonic neural component may further include a plurality of first output waveguides formed on the board such that at least one of the first output waveguides crosses at least one of the inter-node waveguides of the first ring with a core of one of the crossing waveguides passing through a core or a clad of the other, each first output waveguide connected to outside the first ring and configured to receive a reflected optical signal produced by a mirror of the first mirror group and transmit the reflected optical signal to outside the first ring. The photonic neural component may further include a first output filter formed on the board, the first output filter configured to apply a weight to a reflected optical signal produced by a mirror of the plurality of mirrors before the reflected optical signal is transmitted to outside the first ring by the first output waveguide that receives the reflected optical signal. The plurality of optical receivers may include a first outer optical receiver group having two or more of the optical receivers disposed outside the first ring, each of the optical receivers of the first outer optical receiver group connected to a first output waveguide of the plurality of first output waveguides and configured to receive the reflected optical signal transmitted by the first output waveguide. The plurality of inter-node waveguides may include a second ring having two or more of the inter-node waveguides arranged as concentric loops, the plurality of optical transmitters may include a second inner optical transmitter group having two or more of the optical transmitters disposed inside the second ring and a second outer optical transmitter group having two or more of the optical transmitters disposed outside the second ring, the plurality of optical receivers may include a second optical receiver group having two or more of the optical receivers disposed inside the second ring, the photonic neural component may further include a plurality of second input waveguides formed on the board such that at least one of the second input waveguides crosses at least one of the inter-node waveguides of the second ring with a core of one of the crossing waveguides passing through a core or a clad of the other, each second input waveguide optically connected to an optical transmitter of the second outer optical transmitter group and configured to receive an optical signal emitted from the optical transmitter and transmit the received optical signal to an inter-node waveguide of the second ring, and the plurality of intra-node signal lines may include a plurality of inter-ring intra-node signal lines, each inter-ring intra-node signal line connected to an optical receiver of the first outer optical receiver group and an optical transmitter of the second outer optical transmitter group and configured to receive an electrical signal representing a power of an optical signal received by the optical receiver and transmit the electrical signal to the optical transmitter, thereby connecting the optical receiver and the optical transmitter to form an input and an output of a neuron. The photonic neural component may support input/output functionality and expandability of the photonic neural component as a neural network or portion thereof.

In accordance with an embodiment of the present invention, the photonic neural component may further include a plurality of first input waveguides formed on the board such that at least one of the first input waveguides crosses at least one of the inter-node waveguides of the first ring with a core of one of the crossing waveguides passing through a core or a clad of the other, each first input waveguide connected to outside the first ring and configured to receive an optical signal from outside the first ring and transmit the received optical signal to an inter-node waveguide of the first ring. The plurality of optical transmitters may include a first outer optical transmitter group having two or more of the optical transmitters disposed outside the first ring, each of the first optical transmitters of the first outer optical transmitter group optically connected to a first input waveguide of the plurality of first input waveguides and configured to emit an optical signal to be transmitted by the first input waveguide. The plurality of inter-node waveguides may include a second ring having two or more of the inter-node waveguides arranged as concentric loops, the plurality of optical transmitters may include a second inner optical transmitter group having two or more of the optical transmitters disposed inside the second ring, the plurality of optical receivers may include a second optical receiver group having two or more of the optical receivers disposed inside the second ring and a second outer optical receiver group having two or more of the optical receivers disposed outside the second ring, the plurality of mirrors may include a second mirror group, each mirror of the second mirror group configured to partially reflect an optical signal propagating on an inter-node waveguide of the second ring to produce a reflected optical signal, the photonic neural component may further include a plurality of second output waveguides formed on the board such that at least one of the second output waveguides crosses at least one of the inter-node waveguides of the second ring with a core of one of the crossing waveguides passing through a core or a clad of the other, each second output waveguide optically connected to an optical receiver of the second outer optical receiver group and configured to receive a reflected optical signal produced by a mirror of the second mirror group and transmit the reflected optical signal to the optical receiver, and the plurality of intra-node signal lines may include a plurality of inter-ring intra-node signal lines, each inter-ring intra-node signal line connected to an optical transmitter of the first outer optical receiver group and an optical receiver of the second outer optical receiver group and configured to receive an electrical signal representing a power of an optical signal received by the optical receiver and transmit the electrical signal to the optical transmitter, thereby connecting the optical receiver and the optical transmitter to form an input and an output of a neuron. The photonic neural component may support input/output functionality and expandability of the photonic neural component as a neural network or portion thereof.

The summary clause does not necessarily describe all of the features of the embodiments of the present invention. The present invention may also be a combination or subcombination of the features described above, including a combination of features from two or more of the aspects described above. The above and other features and advantages of the present invention will become more apparent from the following description of the embodiments, taken in conjunction with the accompanying drawings.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
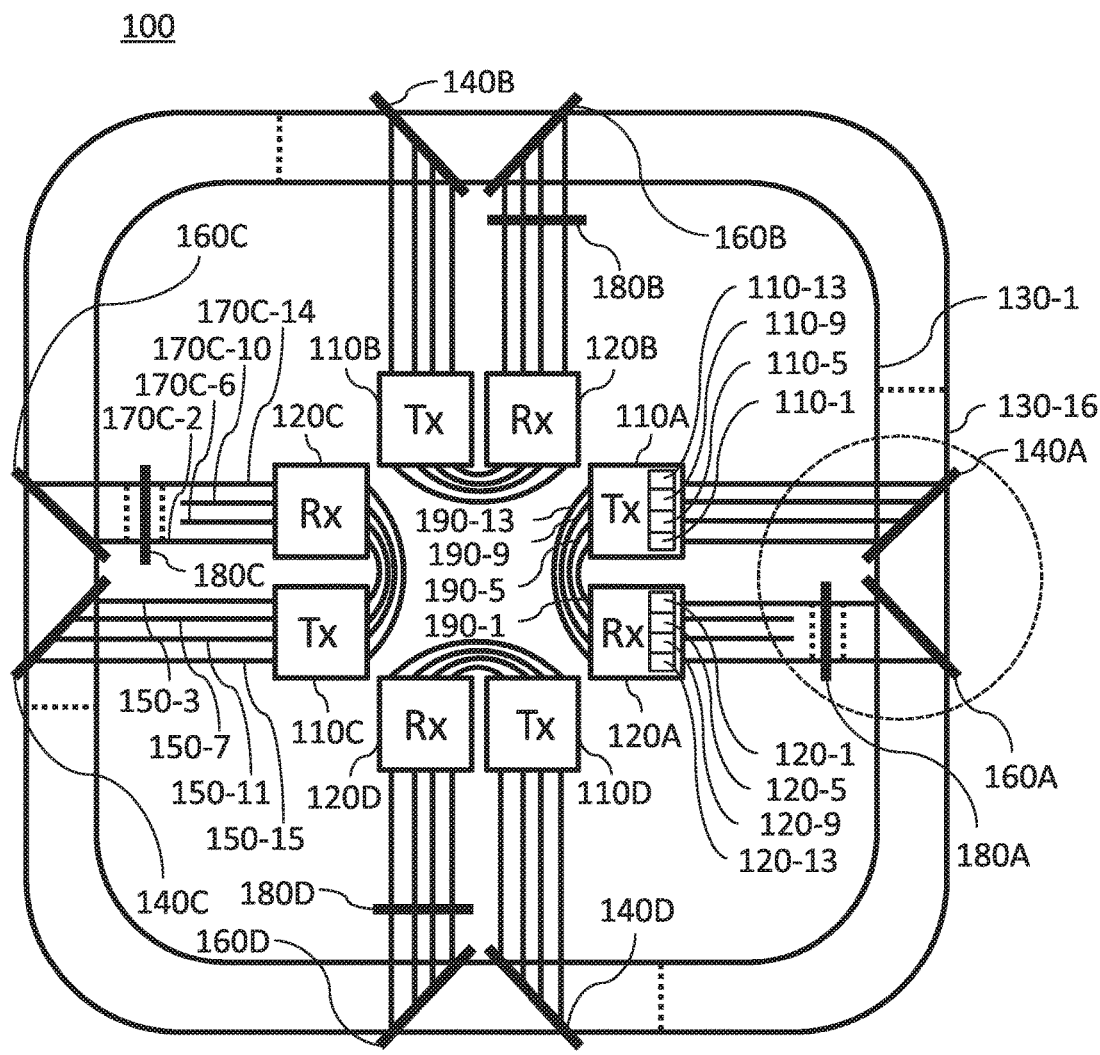
FIG. 1 shows an example schematic of a waveguide architecture for a photonic neural component 100 according to an embodiment of the present invention.

FIG. 1 shows an example schematic of a waveguide architecture for a photonic neural component 100 according to an embodiment of the present invention. Using the waveguide architecture shown in FIG. 1, a photonic neural component 100 can support photonic spike computing by optical signal transmission with low loss via waveguides formed so as to cross one another on a board, e.g., a printed circuit board. The disclosed waveguide architecture can therefore allow for design flexibility (e.g., layout, materials, etc.) while lifting the speed restriction of the conventional electronic approach. The photonic neural component 100 may include a plurality of optical transmitter chips 110A to 110D, a plurality of optical receiver chips 120A to 120D, a plurality of inter-node waveguides 130-1 to 130-16, a plurality of mirrors 140A to 140D (from-transmitter mirrors), a plurality of transmitting waveguides 150-1 to 150-16, a plurality of mirrors 160A to 160D (to-receiver mirrors), a plurality of receiving waveguides 170A-1 to 170A-16 (with 170A-1, 170A-5, 170A-9, and 170A-13 omitted in this embodiment), 170B-1 to 170B-16 (with 170B-2, 170B-6, 170B-10, and 170B-14 omitted in this embodiment), 170C-1 to 170C-16 (with 170C-3, 170C-7, 170C-11, and 170C-15 omitted in this embodiment), 170D-1 to 170D-16 (with 170D-4, 170D-8, 170D-12, and 170D-16 omitted in this embodiment), a plurality of filters 180A to 180D, and a plurality of intra-node signal lines 190-1 to 190-16.

For ease of illustration, out of inter-node waveguides 130-1 to 130-16, only the innermost inter-node waveguide 130-1 and the outermost signal line 130-16 are shown, with ellipsis in between representing inter-node waveguide 130-2 to 130-15. Similarly, except near the respective optical receiver chips 120A to 120D, only a portion of the receiving waveguides 120A-1 to 120A-16, 120B-1 to 120B-16, 120C-1 to 120C-16, 120D-1 to 120D-16 are shown, with ellipsis representing the remaining receiving waveguides as shown in more detail in FIG. 2 (described below). Moreover, due to limited space, out of the plurality of transmitting waveguides 150-1 to 150-16, only transmitting waveguides 150-3, 150-7, 150-11, and 150-15 are given reference numbers in FIG. 1. Similarly, out of the plurality of receiving waveguides that are shown, only receiving waveguides 170C-2, 170C-6, 170C-10, and 170C-14 are given reference numbers in FIG. 1, and out of the plurality of intra-node signal lines 190-1 to 190-16 only intra-node signal lines 190-1, 190-5, 190-9, and 190-13 are given reference numbers in FIG. 1. Nevertheless, the omitted reference numbers of transmitting waveguides, receiving waveguides, and intra-node signal lines depicted in FIG. 1 may be referred to throughout this disclosure with the understanding that the letter suffixes A through D refer to corresponding optical transmitter chips 110A to 110D and optical receiver chips 120A to 120D and the understanding that the number suffixes-1 through-16 refer to corresponding inter-node waveguides 130-1 to 130-16.

The optical transmitter chip 110A includes a plurality of optical transmitters 110-1, 110-5, 110-9, and 110-13. Similarly, the optical transmitter chip 110B includes a plurality of optical transmitters 110-2, 110-6, 110-10, and 110-14, the optical transmitter chip 110C includes a plurality of optical transmitters 110-3, 110-7, 110-11, and 110-15, and the optical transmitter chip 110D includes a plurality of optical transmitters 110-4, 110-8, 110-12, and 110-16, but for ease of illustration only the optical transmitters 110-1, 110-5, 110-9, and 110-13 are shown. In this example, the number suffixes refer to corresponding inter-node waveguides to which the optical transmitters are connected by a transmitting waveguide as described below. Each of the optical transmitters 110-1 to 110-16 may be, for example, a vertical-cavity surface-emitting laser (VCSEL), such that each of the optical transmitter chips 110A to 110D may include a VCSEL array including VCSELs as the optical transmitters included therein. The optical signals emitted by the plurality of optical transmitters in each of the optical transmitter chips 110A to 110D may be emitted at the same wavelength. For example, all of the optical signals emitted by all of the optical transmitters 110-1 to 110-16 may be emitted at the same wavelength. Thus, the plurality of optical transmitters 110-1 to 110-16 may include two or more optical transmitters (e.g., optical transmitters 110-1 to 110-16) that emit optical signals at the same wavelength. The optical transmitter chips 110A to 110D may be semiconductor chips mounted on a board, e.g., a printed circuit board. In this way, a plurality of semiconductor chips mounted on a board may include optical transmitter chips (e.g., optical transmitter chips 110A and 110B), each of the optical transmitter chips including one or more optical transmitters (e.g., optical transmitter 110-1 of optical transmitter chip 110A, optical transmitter 110-2 of optical transmitter chip 110B), and the optical transmitter chips may include a first optical transmitter chip (e.g., optical transmitter chip 110A) whose one or more optical transmitters emit optical signals at a first wavelength and a second optical transmitter chip (e.g., optical transmitter chip 110B) whose one or more optical transmitters emit optical signals at the first wavelength.

The plurality of optical transmitters 110-1 to 110-16 may be divided into differential pairs in which one of the optical transmitters of a differential pair emits a variable optical signal while the other of the optical transmitters of the differential pair emits a reference optical signal. For example, the first and second optical transmitters (e.g., optical transmitters 110-1 and 110-5) of each optical transmitter chip (e.g., optical transmitter chip 110A) may be a differential pair emitting a variable optical signal and a reference optical signal, respectively. In this way, each of the optical transmitter chips 110A to 110D may include one or more differential pairs of optical transmitters. Similarly, the third and fourth optical transmitters (e.g., optical transmitters 110-9 and 110-13) of each optical transmitter chip (e.g., optical transmitter chip 110A) may be a differential pair emitting a variable optical signal and a reference optical signal, respectively. Thus, each of the optical transmitter chips 110A to 110D may include two or more differential pairs of optical transmitters. Among a differential pair of optical transmitters 110-1 and 110-5 as an example, optical transmitter 110-1 may emit a variable optical signal having a variable power of "SigA1" and optical transmitter 110-5 may emit a reference optical signal having a constant power of "RefA1," so that this differential pair can transmit a signal value corresponding to differential power of SigA1 −RefA1. Alternatively, among the differential pair, optical transmitter 110-1 may emit a variable optical signal "SigA1_positive" and optical transmitter 110-5 may emit a variable optical signal "SigA1_negative," which is an inverted signal of "SigA1_positive." In this implementation, the signal value can be calculated by ½ (SigA1_positive-SigA1_negative). As described in this disclosure, one of these signals (the positive or the negative) may be referred to as "variable" while the other is referred to as "reference."

The optical receiver chip 120A includes a plurality of optical receivers 120-1, 120-5, 120-9, and 120-13. Similarly, the optical receiver chip 120B includes a plurality of optical receivers 120-2, 120-6, 120-10, and 120-14, the optical receiver chip 120C includes a plurality of optical receivers 120-3, 120-7, 120-11, and 120-15, and the optical receiver chip 120D includes a plurality of optical receivers 120-4, 120-7, 120-12, and 120-16, but for ease of illustration only the optical receivers 120-1, 120-5, 120-9, and 120-13 are shown. In this example, the number suffixes refer to corresponding inter-node waveguides to which the optical receivers are not connected by a receiving waveguide as described below. (More particularly, as described in more detail below, each of the optical receivers may be connected to an optical transmitter by an intra-node signal line, while being connected to multiple inter-node waveguides by multiple receiving waveguides. The number suffixes of the optical receivers have been chosen by arbitrary convention so as to match the number suffix of the connected optical transmitter, which results in a number suffix that corresponds to an inter-node waveguide to which the optical receiver is not connected by a receiving waveguide.) Each of the optical receivers 120-1 to 120-16 may be, for example, a photodiode, such that each of the optical receiver chips 120A to 120D may include a photodiode array including photodiodes as the optical receivers included therein. The optical receiver chips 120A to 120D may be semiconductor chips mounted on a board, e.g., a printed circuit board. The board may be the same board on which the optical transmitter chips 110A to 110D are mounted. In this way, a plurality of semiconductor chips mounted on a board may include optical receiver chips (e.g., optical receiver chips 120A and 120B), each of the optical receiver chips including one or more optical receivers (e.g., optical receiver 120-1 of optical receiver chip 120A, optical receiver 120-1 of optical receiver chip 120B). More generally, each of the semiconductor chips mounted on the board may include at least one of the optical transmitters (e.g., optical transmitter 110-1) or at least one of the optical receivers (e.g., optical receiver 120-1).

The plurality of inter-node waveguides 130-1 to 130-16 are formed on a board, e.g., a printed circuit board, and may be made of polymer in a single layer of the board. (Note that "on" a board is not limited to formation in an upper layer of the board and includes formation inside the board.) The plurality of inter-node waveguides 130-1 to 130-16 may be formed on the same board on which the optical transmitter chips 110A to 110D and/or optical receiver chips 120A to 120D are mounted. The plurality of inter-node waveguides 130-1 to 130-16 may be arranged with a fine pitch and may share a clad. The plurality of inter-node waveguides 130-1 to 130-16 may be arranged as concentric loops, e.g., circles, ovals, ellipses, rounded squares or rectangles, rounded pentagons, or any other rounded polygons or other shapes that can be arranged as concentric loops. In a case where the plurality of optical transmitters 110-1 to 110-16 includes two or more optical transmitters that emit optical signals at the same wavelength, the plurality of inter-node waveguides 130-1 to 130-16 may include an inter-node waveguide dedicated to each of the two or more optical transmitters. That is, inter-node waveguides may be dedicated to optical transmitters in the sense that they only propagate optical signals emitted from the optical transmitters to which they are dedicated. The plurality of inter-node waveguides 130-1 to 130-16 may be dedicated to the plurality of optical transmitters 110-1 to 110-16, respectively.

The plurality of transmitting waveguides 150-1 to 150-16 are formed on a board, e.g., a printed circuit board, such that at least one of the transmitting waveguides 150-1 to 150-16 crosses at least one of the inter-node waveguides 130-1 to 130-16 with a core of one of the crossing waveguides passing through a core or a clad of the other. The plurality of transmitting waveguides 150-1 to 150-16 may be formed on the same board on which the inter-node waveguides 130-1 to 130-16 are formed and/or the same board on which the optical transmitter chips 110A to 110D and/or optical receiver chips 120A to 120D are mounted. The transmitting waveguides 150-1 to 150-16 and inter-node waveguides 130-1 to 130-16 may be made of polymer in a single layer of the board. Each transmitting waveguide 150-1 to 150-16 may be optically connected to an optical transmitter of the plurality of optical transmitters 110-1 to 110-16 and configured to receive an optical signal emitted from the optical transmitter and transmit the received optical signal to an inter-node waveguide of the plurality of inter-node waveguides 130-1 to 130-16. In the example of FIG. 1, the transmitting waveguide 150-1 (reference numeral omitted, see FIG. 2), which does not cross any of the inter-node waveguides 130-1 to 130-16, is optically connected to the optical transmitter 110-1 (as schematically illustrated by its positioning) and configured to receive an optical signal emitted from the optical transmitter 110-1 and transmit the received optical signal to the inter-node waveguide 130-1. Similarly, the transmitting waveguide 150-5 (reference numeral omitted, see FIG. 2) is optically connected to the optical transmitter 110-5 and configured to receive an optical signal emitted from the optical transmitter 110-5 and transmit the received optical signal to the inter-node waveguide 130-5. However, unlike the transmitting waveguide 150-1, the transmitting waveguide 150-5 crosses at least one of the inter-node waveguides 130-1 to 130-16, namely the inter-node waveguides 130-1 to 130-4. By virtue of the optical properties (size, refractive index profile, etc.) of the transmitting waveguide 150-5 and the inter-node waveguides 130-1 to 130-4, the core of the transmitting waveguide 150-5 may pass through the core or the clad of each of the inter-node waveguides 130-1 to 130-4 on the way to the inter-node waveguide 130-5. Alternatively, the core of each of the inter-node waveguides 130-1 to 130-4 may pass through the core or the clad of the transmitting waveguide 150-5. To reduce cross talk of optical signals between crossing waveguides (e.g., part of an optical signal from one waveguide combining with an optical signal in the other waveguide), the angle between the crossing waveguides at the crossing point may be close to or substantially 90 degrees. Moreover, some dedicated index profile scheme can be applied to decrease the loss. (See, for example, U.S. Patent Application Pub. No. 2013/0101256 A1 ("Design for reducing loss at intersection in optical waveguides")). Just as the transmitting waveguides 150-1 and 150-5 are optically connected to and configured to receive optical signals emitted from respective optical transmitters 110-1 and 110-5 and transmit the received optical signals to respective inter-node waveguides 130-1 and 130-5, the plurality of transmitting waveguides 150-1 to 150-16 may be optically connected to and configured to receive optical signals emitted from respective optical transmitters 110-1 to 110-16 and transmit the received optical signals to inter-node waveguides 130-1 to 130-16 with the understanding that the number suffixes-1 through-16 refer to corresponding optical transmitters 110-1 to 110-16 and inter-node waveguides 130-1 to 130-16.

The plurality of mirrors 140A to 140D (from-transmitter mirrors) are formed on a board, e.g., a printed circuit board, each mirror 140A to 140D configured to reflect an optical signal propagating on a transmitting waveguide of the plurality of transmitting waveguides 150-1 to 150-16 onto an inter-node waveguide of the plurality of inter-node waveguides 130-1 to 130-16, such that the optical signals emitted from the optical transmitters 110-1 to 110-16 are transmitted to the inter-node waveguides 130-1 to 130-16. For example, the mirror 140A may reflect optical signals propagating on transmitting waveguides 150-1, 150-5, 150-9, and 150-13 respectively onto inter-node waveguides 130-1, 130-5, 130-9, and 130-13. Similarly, the mirror 140B may reflect optical signals propagating on transmitting waveguides 150-2, 150-6, 150-10, and 150-14 respectively onto inter-node waveguides 130-2, 130-6, 130-10, and 130-14, the mirror 140C may reflect optical signals propagating on transmitting waveguides 150-3, 150-7, 150-11, and 150-15 respectively onto inter-node waveguides 130-3, 130-7, 130-11, and 130-15, and the mirror 140D may reflect optical signals propagating on transmitting waveguides 150-4, 150-8, 150-12, and 150-16 respectively onto inter-node waveguides 130-4, 130-8, 130-12, and 130-16. As used throughout this disclosure, the term "mirror" may refer to a plurality of mirror elements arranged as a mirror array. For example, the mirror 140A may include a plurality of mirror elements that separately reflect the optical signals propagating on each of the transmitting waveguides 150-1, 150-5, 150-9, and 150-13 or a plurality thereof. Similarly, the mirror 140B may include a plurality of mirror elements that separately reflect the optical signals propagating on each of the transmitting waveguides 150-2, 150-6, 150-10, and 150-14 or a plurality thereof. Also, the term "mirror" may refer to a single mirror element of a mirror array. The plurality of mirrors 140A to 140D may be formed on the same board on which the inter-node waveguides 130-1 to 130-16 are formed and/or the same board on which the optical transmitter chips 110A to 110D and/or optical receiver chips 120A to 120D are mounted. The plurality of mirrors 140A to 140D may have reflection coefficients of substantially 1 for light incident on the side facing the transmitting waveguides 150-1 to 150-16 while having a reflection coefficient of substantially 0 for light incident on the opposite side. In this way, the mirrors 140A to 140D may reflect the optical signals transmitted by the transmitting waveguides 150-1 to 150-16 onto the inter-node waveguides 130-1 to 130-16 while allowing optical signals already propagating on the inter-node waveguides 130-1 to 130-16 to pass through. This may be useful especially in a case where the plurality of mirrors 140A to 140D are not arrays of mirror elements but simple mirrors that cross all of the inter-node waveguides 130-1 to 130-16. In a case where a mirror 140A to 140D crosses all of the inter-node waveguides 130-1 to 130-16 or includes mirror elements for all of the inter-node waveguides 130-1 to 130-16, the reflection coefficient for light incident on the side facing the transmitting waveguides may be substantially zero, substantially one, or any arbitrary number for inter-node waveguides to which no transmitting waveguide is connected.

The plurality of mirrors 160A to 160D (to-receiver mirrors) are formed on a board, e.g., a printed circuit board, each mirror 160A to 160D configured to partially reflect an optical signal propagating on an inter-node waveguide of the plurality of inter-node waveguides 130-1 to 130-16 to produce a reflected optical signal. For example, the mirror 160A may partially reflect optical signals propagating on each of the inter-node waveguides 130-1 to 130-16. Similarly, each of the mirrors 160B to 160D may partially reflect optical signals propagating on each of the inter-node waveguides 130-1 to 130-16. The plurality of mirrors 160A to 160D may be formed on the same board on which the inter-node waveguides 130-1 to 130-16 are formed and/or the same board on which the optical transmitter chips 110A to 110D and/or optical receiver chips 120A to 120D are mounted.

The plurality of receiving waveguides 170A-1 to 170A-16 (with 170A-1, 170A-5, 170A-9, and 170A-13 omitted in this embodiment), 170B-1 to 170B-16 (with 170B-2, 170B-6, 170B-10, and 170B-14 omitted in this embodiment), 170C-1 to 170C-16 (with 170C-3, 170C-7, 170C-11, and 170C-15 omitted in this embodiment), 170D-1 to 170D-16 (with 170D-4, 170D-8, 170D-12, and 170D-16 omitted in this embodiment) (collectively referred to as receiving waveguides 170A-1 to 170D-16 hereinafter) are formed on a board, e.g., a printed circuit board, such that at least one of the receiving waveguides 170A-1 to 170D-16 crosses at least one of the inter-node waveguides 130-1 to 130-16 with a core of one of the crossing waveguides passing through a core or a clad of the other. The plurality of receiving waveguides 170A-1 to 170D-16 may be formed on the same board on which the inter-node waveguides 130-1 to 130-16 are formed and/or the same board on which the optical transmitter chips 110A to 110D and/or optical receiver chips 120A to 120D are mounted. The receiving waveguides 170A-1 to 170D-16, transmitting waveguides 150-1 to 150-16, and inter-node waveguides 130-1 to 130-16 may be made of polymer in a single layer of the board. Each receiving waveguide 170A-1 to 170D-16 may be optically connected to an optical receiver of the plurality of optical receivers 120-1 to 120-16 and configured to receive a reflected optical signal produced by a mirror of the plurality of mirrors 160A to 160D and transmit the reflected optical signal to the optical receiver. In the example shown in FIG. 1 (see also FIG. 2), the receiving waveguide 170A-2 (reference numeral omitted in FIG. 1) is optically connected to the optical receiver 120-1 and configured to receive a reflected optical signal produced by the mirror 160A and transmit the reflected optical signal to the optical receiver 120-1. Note that, as described in more detail below with reference to FIG. 2, the receiving waveguide 170A-2 is optically connected to the optical receiver 120-1 via receiving waveguides 170A-3 and 170A-4 by means of two combiners 210. In this way, each of receiving waveguides 170A-2, 170A-3, and 170A-4 can be said to be optically connected to optical receiver 120-1. (Similarly, each of receiving waveguides 170-14, 170-15, and 170-16 can be said to be optically connected to optical receiver 120-13.) The receiving waveguide 170A-2 crosses at least one of the inter-node waveguides 130-1 to 130-16, namely the inter-node waveguide 130-1. By virtue of the optical properties (size, refractive index profile, etc.) of the receiving waveguide 170A-2 and the inter-node waveguide 130-1, the core of the receiving waveguide 170A-2 may pass through the core or the clad of the inter-node waveguide 130-1 on the way to the optical receiver 120-1. Alternatively, the core of the inter-node waveguide 130-1 may pass through the core or the clad of the receiving waveguide 170A-2. To reduce cross talk of optical signals between crossing waveguides (e.g., part of an optical signal from one waveguide combining with an optical signal in the other waveguide), the angle between the crossing waveguides at the crossing point may be close to or substantially 90 degrees. Just as the receiving waveguide 170A-2 is optically connected to optical receiver 120-1 and configured to receive reflected optical signals produced by the mirror 160A and transmit the reflected optical signals to the optical receiver 120-1, the plurality of receiving waveguides 170A-1 to 170D-16 may be optically connected to optical receivers 120-1 to 120-16 and configured to receive reflected optical signals produced by mirrors 160A to 160D and transmit the reflected optical signal to the optical receivers 120-1 to 120-16. As described in more detail below with respect to FIG. 2, the reference numerals of the receiving waveguides 170A-1 to 170D-16 are defined such that the letter suffixes A through D refer to corresponding optical receiver chips 120A to 120D and the number suffixes-1 through-16 refer to corresponding inter-node waveguides 130-1 to 130-16 from which the receiving waveguides receive optical signals.

The plurality of filters 180A to 180D are formed on a board, e.g., a printed circuit board, each filter 180A to 180D configured to apply a weight to a reflected optical signal produced by a mirror of the plurality of mirrors 160A to 160D before the reflected optical signal is transmitted to an optical receiver 120-1 to 120-16 by the receiving waveguide 170A-1 to 170D-16 that receives the reflected optical signal. For example, the filter 180A may apply weights to reflected optical signals produced by the mirror 160A before the reflected optical signals are transmitted to the optical receivers 120-1, 120-5, 120-9, and 120-13 by the receiving waveguides 170A-2, 170A-3, 170A-4, 170A-6, 170A-7, 170A-8, 170A-10, 170A-11, 170A-12, 170A-14, 170A-15, and 170A-16. Similarly, each of the filters 180B to 180D may apply weights to reflected optical signals produced by the mirrors 180B to 180D, respectively, before the reflected optical signals are transmitted to the optical receivers 120-2, 120-6, 120-10, and 120-14 of optical receiver chip 120B, the optical receivers 120-3, 120-7, 120-11, and 120-15 of optical receiver chip 120C, and the optical receivers 120-4, 120-8, 120-12, and 120-16 of optical receiver chip 120D, respectively. The plurality of filters 180A to 180D may be formed on the same board on which the inter-node waveguides 130-1 to 130-16 are formed and/or the same board on which the optical transmitter chips 110A to 110D and/or optical receiver chips 120A to 120D are mounted. Any or all of the plurality of filters 180A to 180D may be neutral density filters. As used throughout this disclosure, the term "filter" may refer to a plurality of filter elements arranged as a filter array. For example, the filter 180A may include a plurality of filter elements that apply separate weights to optical signals transmitted on each of the receiving waveguides 170A-2, 170A-3, 170A-4, 170A-6, 170A-7, 170A-8, 170A-10, 170A-11, 170A-12, 170A-14, 170A-15, and 170A-16. Similarly, the filter 180B may include a plurality of filter elements that apply separate weights to optical signals transmitted one each of the receiving waveguides 170B-1, 170B-3, 170B-4, 170B-5, 170B-7, 170B-8, 170B-9, 170B-11, 170B-12, 170B-13, 170B-15, and 170B-16.

Each of intra-node signal lines 190-1 to 190-16 is connected to an optical receiver of the plurality of optical receivers 120-1 to 120-16 and an optical transmitter of the plurality of optical transmitters 110-1 to 110-16 and is configured to receive an electrical signal representing a power of an optical signal received by the optical receiver and transmit the electrical signal to the optical transmitter, thereby connecting the optical receiver and the optical transmitter to form an input and an output of a neuron. For example, the intra-node signal 190-1 may be connected to the optical receiver 120-1 and the optical transmitter 110-1 and configured to receive an electrical signal representing a power of an optical signal received by the optical receiver 120-1 and transmit the electrical signal to the optical transmitter 110-1, thereby connecting the optical receiver 120-1 and the optical transmitter 110-1 to form an input and an output of a neuron. (The various waveguides, including the transmitting waveguides, receiving waveguides, and inter-node waveguides, may thus function as synapses.) In this way, in the specific example of FIG. 1, each set of transmitter chip 110 and receiver chip 120 having the same letter suffix (e.g., transmitter chip 110A and receiver chip 120A) may comprise two or four neurons depending on whether the optical transmitters 110-1 to 110-16 are divided into differential pairs. In the case of differential pairs, for example, the set of transmitter chip 110A and receiver chip 120A may include a first neuron having a variable optical transmitter 110-1, a reference optical transmitter 110-5, optical receivers 120-1 and 120-5, and intra-node signal lines 190-1 and 190-5 and may include a second neuron having a variable optical transmitter 110-9, a reference optical transmitter 110-13, optical receivers 120-9 and 120-13, and intra-node signal lines 190-19 and 190-13. However, the number of neurons in a chip pair can be any number. Furthermore, in some embodiments, optical transmitters and optical receivers can be implemented in a single chip.

In the example of FIG. 1, each of the optical transmitter chips 110A to 110D includes the same number of optical transmitters (e.g., four optical transmitters 110-1, 110-5, 110-9, and 110-13 for optical transmitter chip 110A) and each of the optical receiver chips 120A to 120D includes the same number of optical receivers (e.g., four optical receivers 120-1, 120-5, 120-9, and 120-13 for optical receiver chip 120A). Moreover, the number of optical transmitters (e.g., four) included in each of the optical transmitter chips 110A to 110D is the same as the number of optical receivers (e.g., four) included in each of the optical receiver chips 120A to 120D. In this case, the number of inter-node waveguides 130-1 to 130-16 connected to each of the optical transmitter chips via the transmitting waveguides (e.g., four, such as inter-node waveguides 130-1, 130-5, 130-9, and 130-13 connected to optical transmitter chip 110A via transmitting waveguides 150-1, 150-5, 150-9, and 150-13, or inter-node waveguides 130-2, 130-6, 130-10, and 130-14 connected to optical transmitter chip 110B via transmitting waveguides 150-2, 150-6, 150-10, and 150-14) may be the same as the number of optical transmitters included in each of the optical transmitter chips (e.g., four) and the number of optical receivers included in each of the optical receiver chips (e.g., four).

Figure 2:
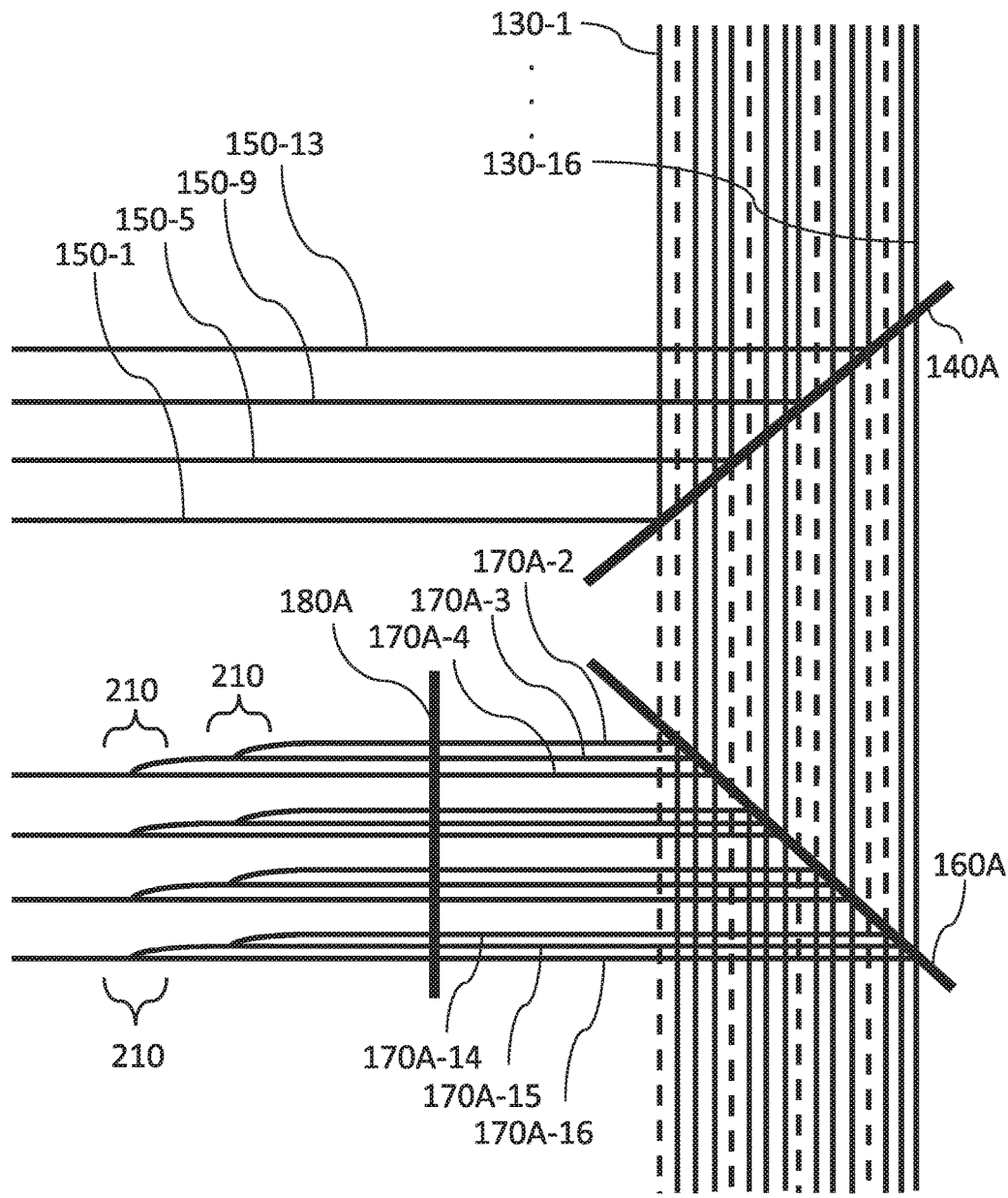
FIG. 2 shows an example schematic of a region of the waveguide architecture shown in FIG. 1.

FIG. 2 shows an example diagram of a region of the waveguide architecture shown in FIG. 1, namely the region indicated by the dashed circle in FIG. 1. As shown in FIG. 2, transmitting waveguides 150-1, 150-5, 150-9, and 150-13 receive optical signals emitted respectively from optical transmitters 110-1, 110-5, 110-9, and 110-13 of optical transmitter chip 110A and transmit the received optical signals to inter-node waveguides 130-1, 130-5, 130-9, and 130-13, respectively, via the mirror 140A. Meanwhile, optical signals propagating on inter-node waveguides 130-2, 130-3, 130-4, 130-6, 130-7, 130-8, 130-10, 130-11, 130-12, 130-14, 130-15, and 130-16 are reflected by mirror 160A and the reflected optical signals are respectively received by receiving waveguides 170A-2, 170A-3, 170A-4, 170A-6, 170A-7, 170A-8, 170A-10, 170A-11, 170A-12, 170A-14, 170A-15, and 170A-16 to be transmitted to optical receivers 120-1, 120-5, 120-9, and 120-13 of optical receiver chip 120A. The receiving waveguides that would correspond to inter-node waveguides 130-1, 130-5, 130-9, and 130-13 (e.g., receiving waveguides 170A-1, 170A-5, 170A-9, and 170A-13) are omitted in this embodiment because the inter-node waveguides 130-1, 130-5, 130-9, and 130-13 propagate optical signals emitted from the optical transmitter chip 110A, to which the optical receiver chip 120A is connected as a chip pair to form one or more neurons.

The inter-node waveguides shown as solid lines carry optical signals, while the inter-node waveguides shown as dashed lines are substantially "empty" in the portion shown in FIG. 2. Due to the reflection coefficients of the mirrors 160A to 160D shown and described with respect to FIGS. 3-6 below, the mirror 160A reflects the remaining optical signal propagating in inter-node waveguides 130-2, 130-6, 130-10, and 130-14, therefore emptying these inter-node waveguides (so they are dashed lines after crossing the mirror 160A), whereas the already-empty inter-node waveguides 130-1, 130-5, 130-9, and 130-13, having been emptied by the mirror 160D, receive optical signals from transmitting waveguides 150-1, 150-5, 150-9, and 150-13 via the mirror 140A (so they are solid lines after crossing the mirror 140A).

As also shown in FIG. 2, the photonic neural component may further include a plurality of combiners 210 formed on the board, each combiner configured to optically add an input optical signal to an optical signal propagating on a receiving waveguide of the plurality of receiving waveguides 170A-1 to 170D-16. In FIG. 2, eight such combiners 210 are shown (three of which are given reference numbers). For example, the upper-most combiner 210 shown in FIG. 2 (connecting receiving waveguides 170A-2 and 170A-3) has a y-shaped waveguide structure connected by a first entrance arm and an exit arm to a first receiving waveguide 170A-3, the combiner 210 configured to receive, as the input signal, an optical signal propagating on a second receiving waveguide 170A-2 such that the input signal enters a second entrance arm of the y-shaped waveguide structure and joins an optical signal propagating on the first receiving waveguide 170A-3 where the second entrance arm meets the first entrance arm of the y-shaped waveguide structure. The first entrance arm and the exit arm of the y-shaped waveguide structure 210 may physically be lengths of the first receiving waveguide 170A-3, e.g., those lengths before and after the point where the second entrance arm meets the first receiving waveguide 170A-3 to form the y-shaped waveguide structure. Similarly, the second entrance arm of the y-shaped waveguide structure may physically be a length of the second receiving waveguide 170A-2. In this way, an optical signal propagating on each of the receiving waveguides (e.g., receiving waveguide 170A-2) may be optically added to an optical signal propagating on another of the receiving waveguides (e.g., receiving waveguide 170A-3) via a combiner 210 of the plurality of combiners while being transmitted to the optical receiver (e.g., 120-1) to which the receiving waveguide is connected, the optical addition occurring after a weight has been applied by an optical filter (e.g., 180A) of the plurality of optical filters.

The other seven combiners 210 shown in FIG. 2 may have the same functionality with respect to the receiving waveguides they connect. In this way, the three receiving waveguides 170A-2, 170A-3, and 170A-4 may be combined into one receiving waveguide 170A-4, the three receiving waveguides 170A-6, 170A-7, and 170A-8 may be combined into one receiving waveguide 170A-8, the three receiving waveguides 170A-10, 170A-11, and 170A-12 may be combined into one receiving waveguide 170A-12, and the three receiving waveguides 170A-14, 170A-15, and 170A-16 may be combined into one receiving waveguide 170A-16. Depending on the structure of the combiners 210, fewer combiners 210 may be used, e.g., each combiner 210 formed as a single three-to-one y-shaped waveguide structure that combines three receiving waveguides. Similar combiners 210 may be provided for all of the receiving waveguides 170A-1 to 170D-16. For example, if the receiving waveguides associated with each optical receiver chip 120A to 120D are connected by eight combiners as shown in FIG. 2 with respect to the optical receiver chip 120A, the architecture shown in FIG. 1 may have thirty-two such combiners 210.

Figure 3:
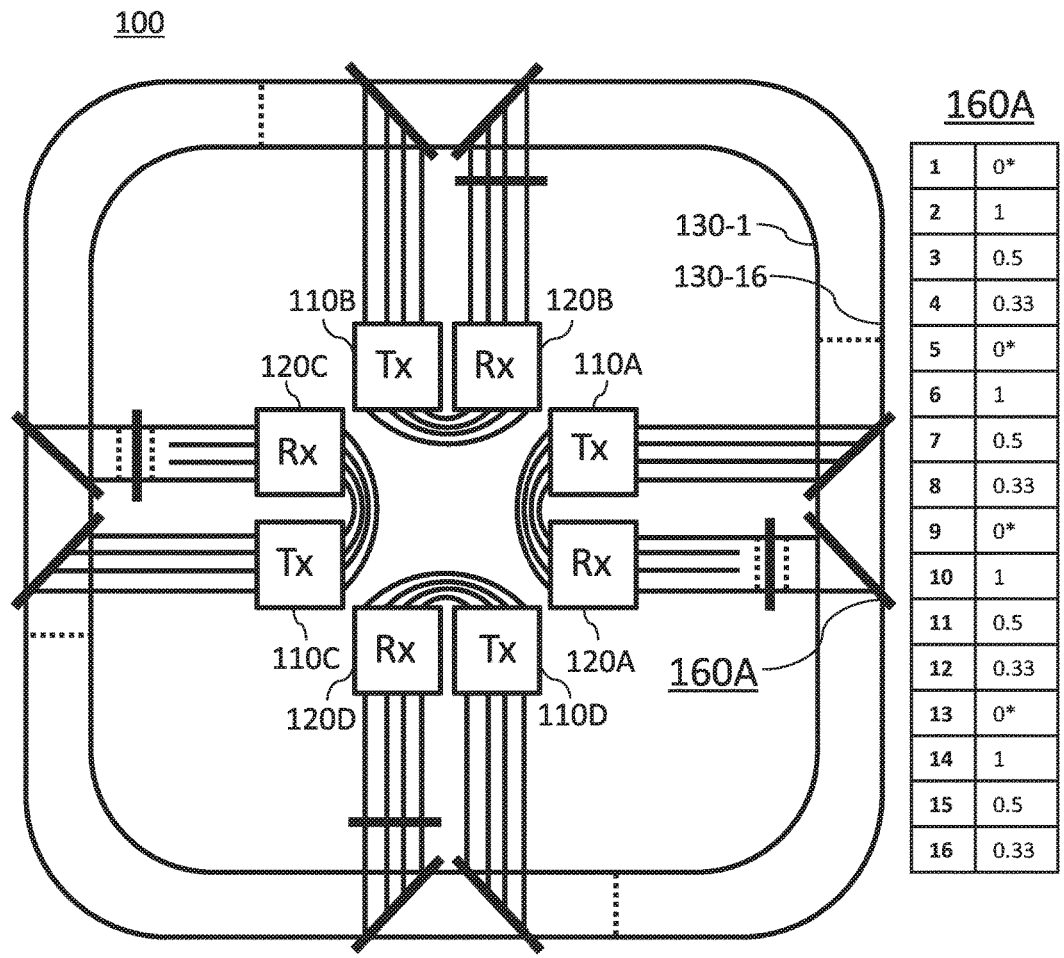
FIG. 3 shows an example schematic of the waveguide architecture shown in FIG. 1 including reflection coefficients of a mirror.
Figure 4:
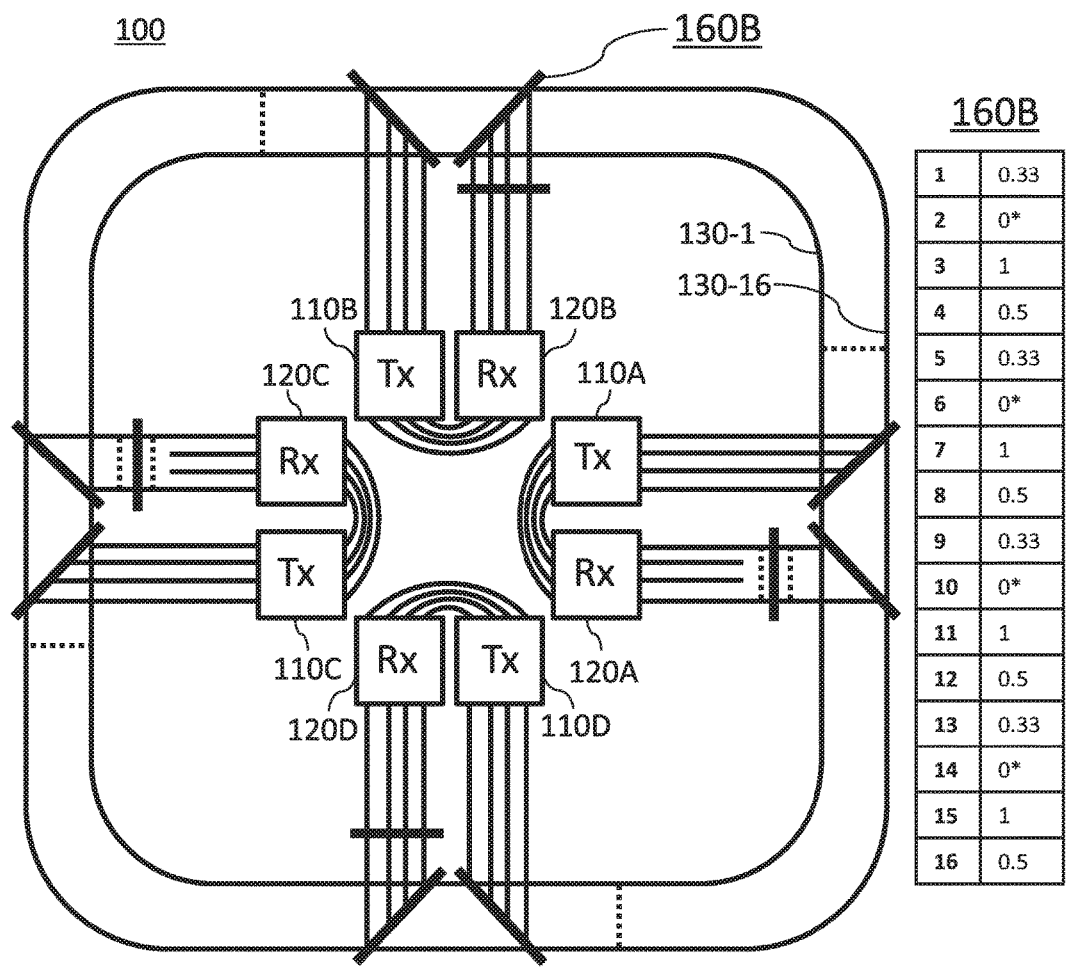
FIG. 4 shows an example schematic of the waveguide architecture shown in FIG. 1 including reflection coefficients of a mirror.
Figure 5:
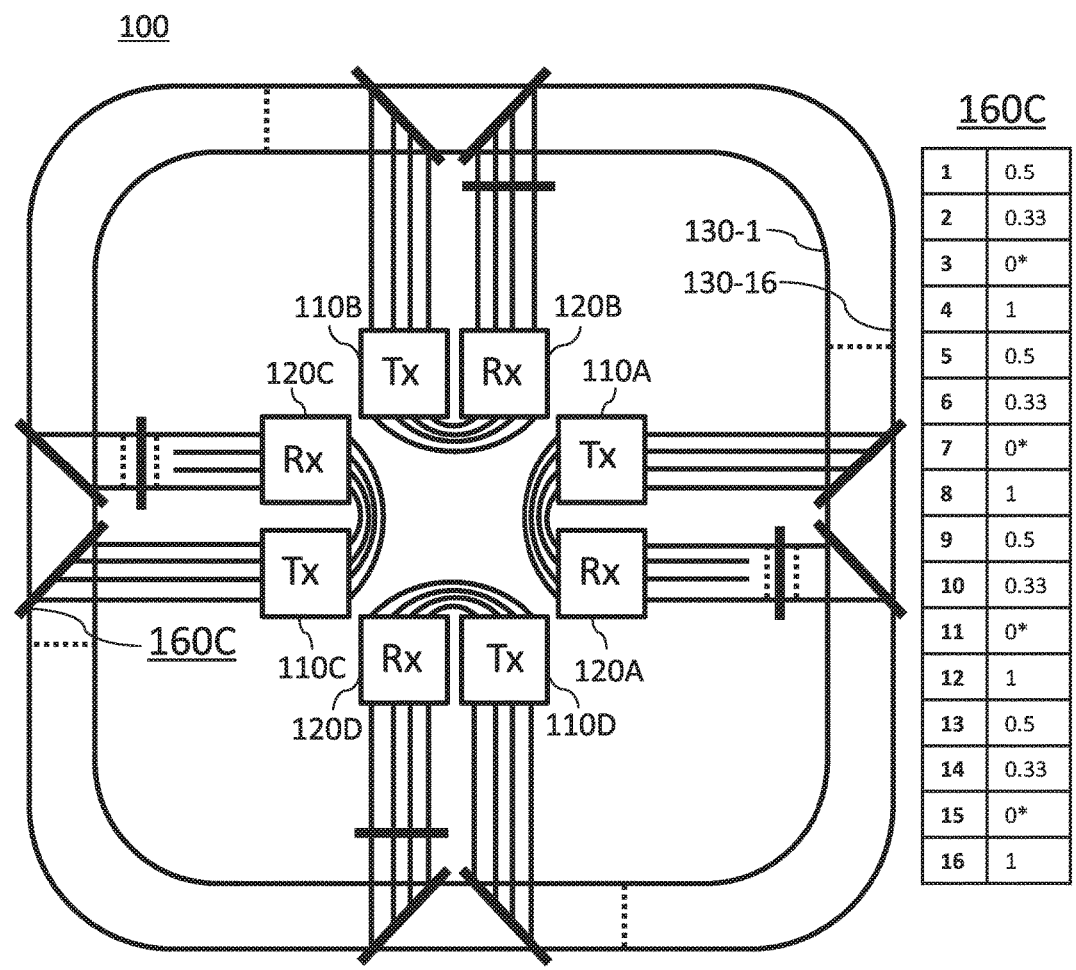
FIG. 5 shows an example schematic of the waveguide architecture shown in FIG. 1 including reflection coefficients of a mirror.
Figure 6:
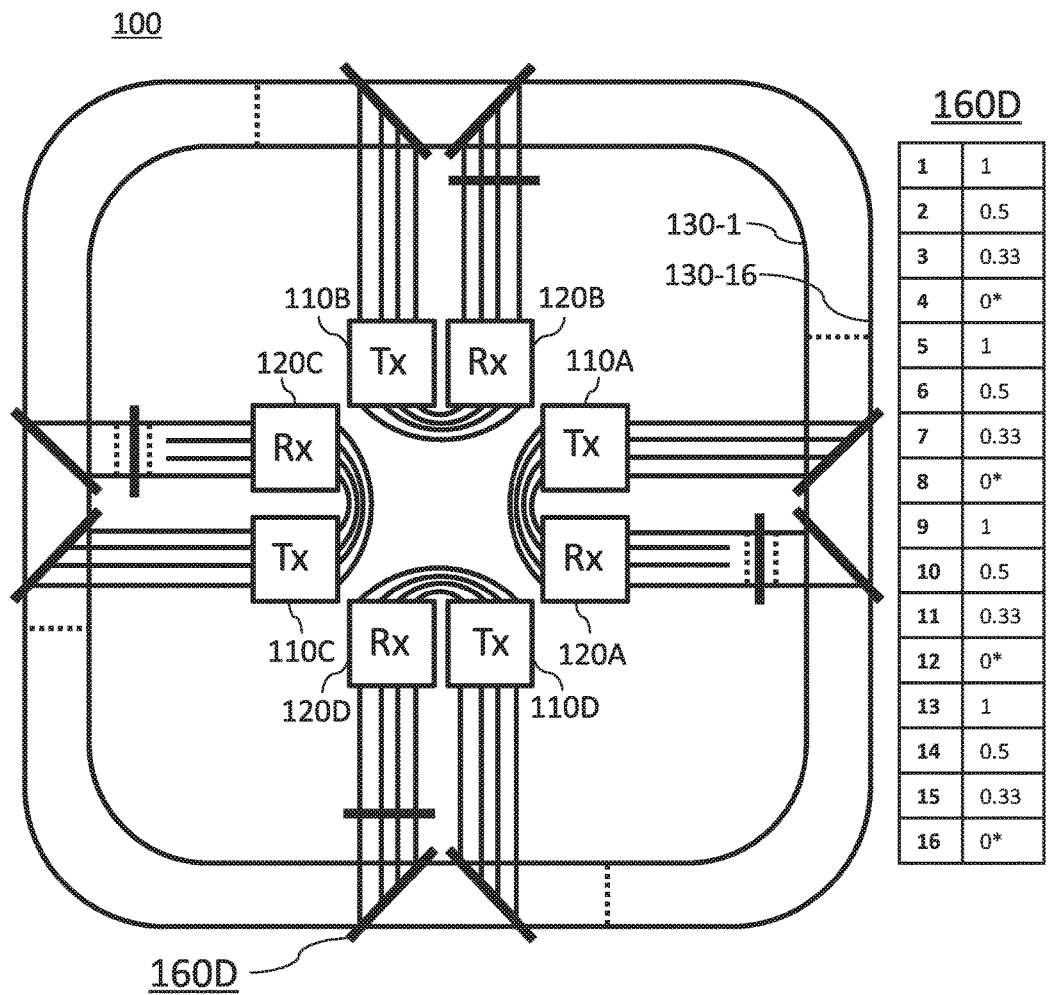
FIG. 6 shows an example schematic of the waveguide architecture shown in FIG. 1 including reflection coefficients of a mirror.

FIG. 3 shows an example diagram of the waveguide architecture shown in FIG. 1 including reflection coefficients of the mirror 160A. FIG. 4 shows an example diagram of the waveguide architecture shown in FIG. 1 including reflection coefficients of the mirror 160B. FIG. 5 shows an example diagram of the waveguide architecture shown in FIG. 1 including reflection coefficients of the mirror 160C. FIG. 6 shows an example diagram of the waveguide architecture shown in FIG. 1 including reflection coefficients of the mirror 160D. Due to limited space and for simplicity, only the optical transmitter chips 110A to 110D, optical receiver chips 120A to 120D, inter-node waveguides 130-1 to 130-16 (partially represented by ellipsis), and mirrors 160A to 160D are given reference numbers in FIGS. 3-6. As described above with respect to FIGS. 1 and 2, each of the inter-node waveguides 130-1 to 130-16 is dedicated to a single corresponding optical transmitter 110-1 to 110-16 so as to propagate the optical signal emitted from that optical transmitter. In the example of FIGS. 3-6, the mirrors 160A to 160D are configured such that the optical receiver chips 120A to 120D of each chip pair (each pair of optical receiver chip and optical transmitting chip) receives all of the optical signals emitted by the optical transmitter chips of the other chip pairs. For example, the mirror 160A is configured such that the optical receiver chip 120A receives all of the optical signals emitted by the optical transmitter chips 120B, 120C, and 120D. Specifically, as noted above, the term "mirror" may refer to a plurality of mirror elements arranged as a mirror array. Thus, each of the mirrors 160A to 160D may include a plurality of mirror elements that separately reflect the optical signals propagating on each of the inter-node waveguides 130-1 to 130-16 or a plurality thereof. With the waveguide architecture shown in FIGS. 3-6, the optical signals propagating on the inter-node waveguides 130-1 to 130-16 are traveling counterclockwise. Thus, when the optical signals emitted by the optical transmitter chip 110D reach the mirror 160A to be reflected to the optical receiver chip 120A, the optical signals have yet to arrive at mirrors 160B and 160C to be reflected to the optical receiver chips 120B and 120C and must be allowed to transmit through the mirror 160A accordingly. When the optical signals emitted by the optical transmitter chip 110C arrive at the optical receiver 120A, the optical signals have yet to arrive at mirror 160B and must be allowed to transmit through the mirror 160A accordingly. When the optical signals emitted by the optical transmitter chip 110C arrive at the optical receiver 120A, the optical signals do not need to go further (in the case where they do not need to be received by the optical receiver chip 110C of the same chip pair as the optical transmitter chip 110C).

On the basis of these principles, the mirrors 160A to 160D may be configured as shown in FIGS. 3-6. Using FIG. 3 as a representative example, the reflection coefficients for mirror 160A are shown for each of inter-node waveguides 130-1 to 130-16. In the left-hand column of the table are the numbers 1 through 16, referring to inter-node waveguides 130-1 to 130-16 respectively. In the right-hand column of the table are reflection coefficients. As shown, the reflection coefficient of mirror 160A for inter-node waveguides 130-4, 130-8, 130-12, and 130-16 is about 0.33 or one-third, allowing for the optical signal emitted from the optical transmitter chip 110D to still be received by two optical receiver chips 120B and 120C, the reflection coefficient of mirror 160A for inter-node waveguides 130-3, 130-7, 130-11, and 130-15 is about 0.5, allowing for one-half of the remaining two-thirds of the optical signal emitted from the optical transmitter chip 110C to still be received by one optical receiver chip 120B (the first one-third having been reflected by the mirror 160D), and the reflection coefficient of mirror 160A for inter-node waveguides 130-2, 130-6, 130-10, and 130-14 is about 1, e.g., the remainder of the optical signal emitted from the optical transmitter chip 110C (after the first two-thirds have been reflected by the mirrors 160C and 160D). As for the reflection coefficient of mirror 160A for inter-node waveguides 130-1, 130-5, 130-9, and 130-13, it is indicated in FIG. 3 as 0* because it may be zero in some embodiments, allowing for no reflection by the mirror 160A of the remaining optical signal emitted from the optical transmitter chip 110A, or it may be any arbitrary value under the assumption that no such optical signal remains in inter-node waveguides 130-1, 130-5, 130-9, and 130-13 after having been reflected by the mirrors 160B, 160C, an 160D. The mirrors 160B, 160C, and 160D may be configured correspondingly, as shown in FIGS. 4, 5, and 6. Thus, for each of the optical receivers 120-1 to 120-16 that is connected to an optical transmitter 110-1 to 110-16 via an intra-node signal line 190-1 to 190-16, the plurality of mirrors 160A to 160D includes a mirror whose reflected optical signal is transmitted to the optical receiver and whose reflection coefficient is substantially zero for the optical signal emitted by the optical transmitter. Note that, in a case where a mirror (e.g., mirror 160A) refers to a mirror array, having a reflection coefficient of substantially zero for the optical signal emitted by a particular optical transmitter (e.g., for the optical signal on a particular inter-node waveguide) may refer to having no mirror element at that position in the mirror array or having any non-reflective surface at that position, including a transparent surface. With reflection coefficients of about 0.33, 0.5, and 1, each optical signal from each optical transmitter may be substantially reflected and divided into a plurality of optical signals having substantially the same power (e.g., ⅓ of the transmitted optical signal in this embodiment without considering optical loss through waveguides) and each divided optical signal may be propagated through a corresponding receiving waveguide.

Figure 7:
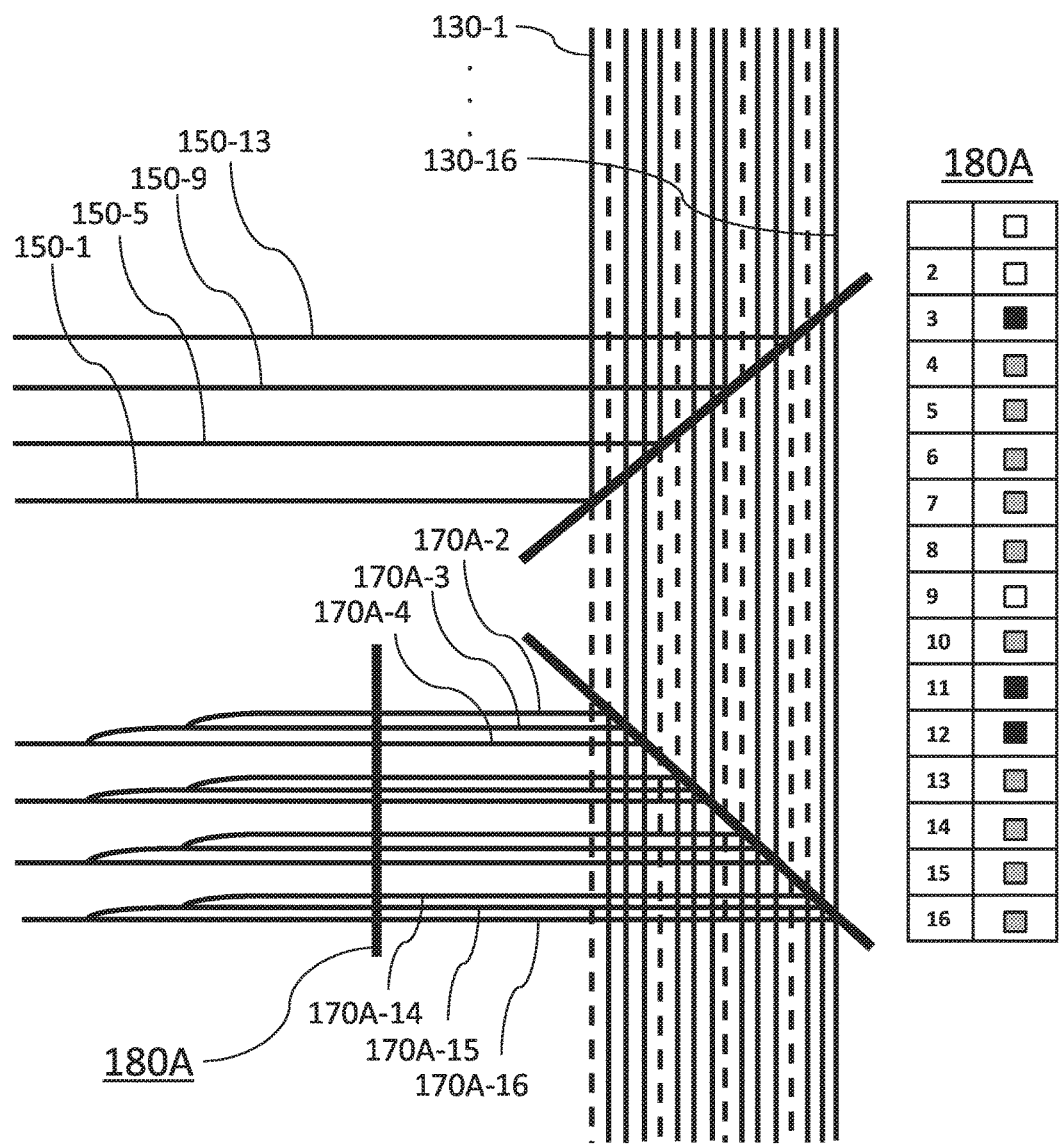
FIG. 7 shows an example schematic of the region of the waveguide architecture shown in FIG. 2 including arbitrary weights of a filter.

FIG. 7 shows an example diagram of the region of the waveguide architecture shown in FIG. 2 including arbitrary weights of the filter 180A. Due to limited space and for simplicity, only the inter-node waveguides 130-1 to 130-16, transmitting waveguides 150-1, 150-5, 150-9, and 150-13, receiving waveguides 170A-2, 170A-3, 170A-4, 170A-14, 170A-15, and 170A-16, and filter 180A are given reference numbers in FIG. 7. As described by way of example with respect to FIGS. 3-6, optical signals propagating on each of the inter-node waveguides 130-1 to 130-16 (optionally omitting the optical signals propagating on inter-node waveguides 130-1, 130-5, 130-9, and 130-13) may be reflected by the mirror 160A such that reflected optical signals of each of the sixteen (or twelve) transmitters is transmitted by respective receiving waveguides 170A-1 to 170A-16 (optionally omitting receiving waveguides 170A-1, 170A-5, 170A-9, and 170A-13 as shown in this example) to the optical receiver chip 120A. The weighting may be different for each of the receiving waveguides 170A-1 to 170A-16, since the filter may be a filter array including multiple filter elements as described above.

In the specific example shown in FIG. 7, arbitrary weights are depicted for each of the receiving waveguides 170A-1 to 170A-16 (but filters corresponding to omitted receiving waveguides 170A-1, 170A-5, 170A-9, and 170A-13 may be omitted). For simplicity, three shades are used: white representing relatively "transparent" filtering, e.g., a high weight, black representing relatively "opaque" filtering, e.g., a low weight, and gray representing filtering with a mid-level weight. However, any number of weight gradations may be possible. In the example shown in FIG. 7, receiving waveguides 170A-5 to 170A-8 and 170A-13 to 170A-16, which are connected to optical receivers 120-5 and 120-13, respectively, are for reference optical signals of differential pairs, and thus they are given the mid-level weight (gray) in this example. The weights depicted for receiving waveguides 170A-1 to 170A-4 and 170A-9 to 170A-12 are intended to represent any arbitrary distribution of weights. In this way, the filter 180A may separately weight the optical signals emitted by each of the optical transmitters 110-1 to 110-16. Similarly, the filters 180B, 180C, and 180D may separately weight the optical signals emitted by each of the optical transmitters 110-1 to 110-16, either by using identical or different weight distributions. In some embodiments, the filter 180A need not apply any weight (or may apply a zero weight) to optical signals corresponding to optical transmitters 110-1, 110-5, 110-9, and 110-13 (e.g., optical signals propagating on omitted optical receivers 170A-1, 170A-5, 170A-9, and 170A-13) because receiving waveguides 170A-1, 170A-5, 170A-9, and 170A-13 may not exist and/or because the mirrors 160A to 160D may be configured to prevent receiving waveguides 170A-1, 170A-5, 170A-9, and 170A-13 from receiving optical signals (such optical signals having been emitted by the optical transmitter chip 110A of the same chip pair). The same may be correspondingly true for the other filters 180B to 180D.

In some embodiments, it may be possible to change the weights of the filters 180A to 180D. For example, the filters 180A to 180D may include one or more exchangeable filters that can be exchanged, e.g., physically removed and replaced, to change the applied weight(s). This replacement can be done by manual operation of a user. Instead of this, a manipulator or a mechanism controlled by a controller or a computer connected to or included in the photonic neural component 100 may change each filter 180A to 180D or the individual filter elements on each receiving waveguide 170A-1 to 170D-16. As another example, the filters 180A to 180D may include one or more variable filters whose transparency can be varied to change the applied weights(s). Varying the transparency may be accomplished in various ways, e.g., using liquid crystal filters whose transparency can be changed by changing the driving voltage, using optical attenuators to change the power of the light, dividing an optical signal into several sub-waveguides and selectively turning ON and OFF optical switches to allow only a portion of the sub-waveguides to propagate the optical signal. Optical receiver 120-4 (of optical receiver chip 120D), as an example, may receive optical signals having a total power of $P_{Rx4}=\frac{1}{3}(W_{D-1}T_{Tx1}+W_{D-2}T_{Tx2}+W_{D-3}T_{Tx3})$ without considering power loss through waveguides, where $T_{Tx1}$, $T_{Tx2}$, and $T_{Tx3}$ represent powers of the emitted optical signals from optical transmitters 110-1 (of optical transmitter chip 110A), 110-2 (of optical transmitter chip 110B), and 110-3 (of optical transmitter chip 110C) respectively, $W_{D-1}$, $W_{D-2}$, and $W_{D-3}$ are weights based on the transparency coefficients of filter 180A for receiving waveguides 170D-1, 170D-2, and 170D-3 respectively (which are combined by combiner 210 to be transmitted to optical receiver 120-4, a differential pair of optical receiver 120-4 and 120-8 (also of optical receiver chip 120D) receive differential optical signals having powers of $P_{Rx4}$ and $P_{Rx8}$, and a received value is calculated based on the difference of these powers (e.g., $P_{Rx4\&8}=P_{Rx4}-P_{Rx8}$). A set of a differential pair of optical receivers (e.g., 120-4 and 120-8) and a corresponding differential pair of optical transmitters (e.g., 110-4 and 110-28) may be included in each neuron, and the output of the neuron may be calculated by applying a neural output function f(x) such as a sigmoid function to a received value or an Integrate and Fire spiking model. For example, the value of the output signal, represented by the difference of optical powers output from the differential pair of optical transmitters 110-4 and 110-8, may be determined (e.g., proportionally determined) based on $f(P_{Rx4\&8})$.

Figure 8:
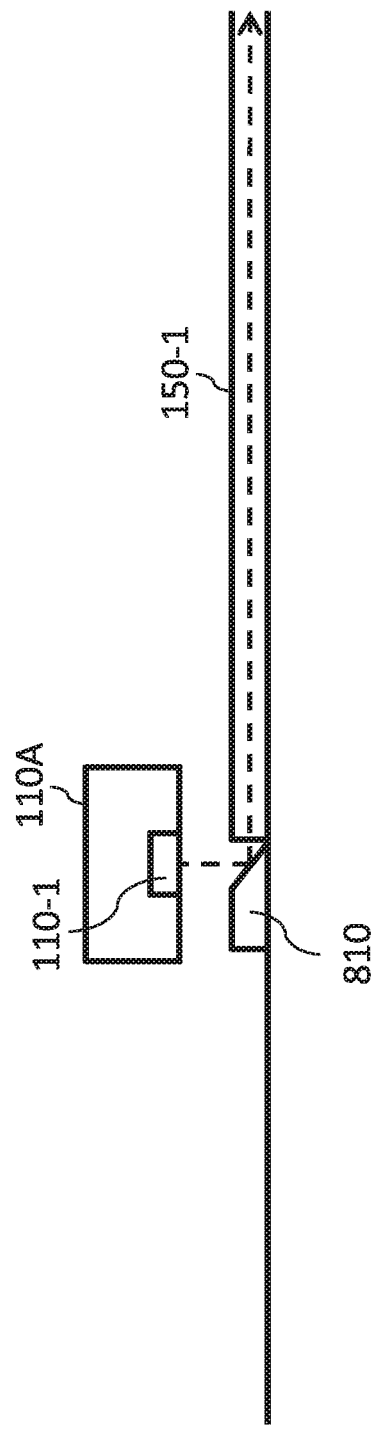
FIG. 8 shows an example schematic side view of a portion of a board on which a transmitter chip and a transmitting waveguide are formed.

FIG. 8 shows an example diagram side view of a portion of a board on which the transmitter chip 110A and the transmitting waveguide 150-1 are formed. In the example of FIG. 8, the board on which the transmitting waveguide 150-1 is formed is the same board on which the optical transmitter chip 110A is mounted. As shown in FIG. 8, the transmitting waveguide 150-1 is formed on a surface of the board (represented by the horizontal surface on which the transmitting waveguide 150-1 is formed), along with an entrance mirror 810 positioned to redirect light from a direction perpendicular to the board to a direction parallel to the board, e.g., at a substantially 45° angle with respect to the board. The optical transmitter chip 110A, including the optical transmitter 110-1, is mounted on the board with the optical transmitter 110-1 facing the board, e.g., by flip chip bonding. The dashed line schematically represents an optical signal emitted by the optical transmitter 110-1.

Figure 9:
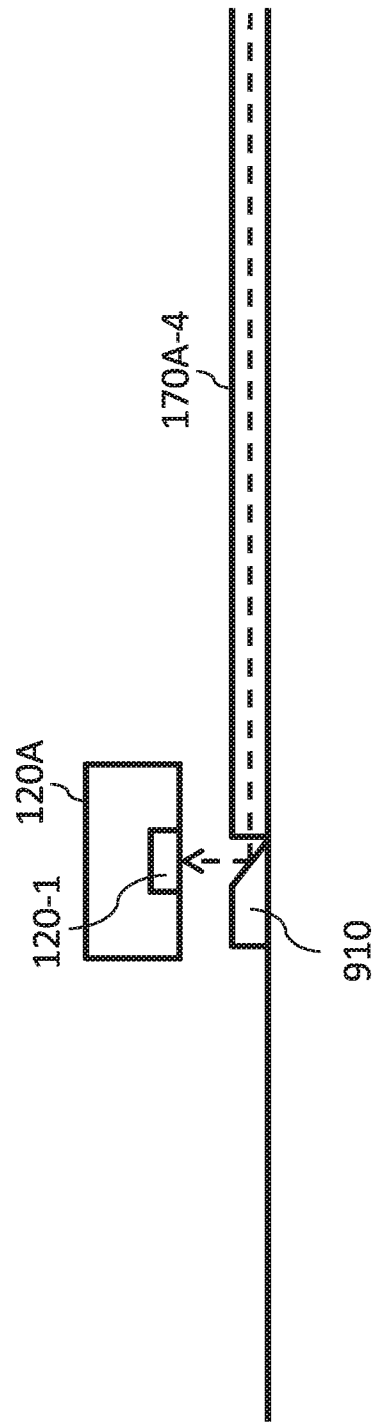
FIG. 9 shows an example schematic side view of a portion of a board on which a receiver chip and a receiving waveguide are formed.

FIG. 9 shows an example diagram side view of a portion of a board on which the receiver chip 120A and the receiving waveguide 170A-4 are formed. In the example of FIG. 9, the board on which the receiving waveguide 170A-4 is formed is the same board on which the optical receiver chip 170A is mounted. As shown in FIG. 9, the receiving waveguide 170A-4 is formed on a surface of the board (represented by the horizontal surface on which the transmitting waveguide 170A-4 is formed), along with an exit mirror 910 to redirect light from a direction parallel to the board to a direction perpendicular to the board, e.g., at a substantially 45° angle with respect to the board. The optical receiver chip 120A, including the optical receiver 120-1, is mounted on the board with the optical receiver 120-1 facing the board, e.g., by flip chip bonding. The dashed line schematically represents an optical signal received by the optical receiver 120-4.

The configuration described with respect to FIG. 8 may also apply to the remainder of the transmitting waveguides 150-5, 150-9, and 150-13 connected to the optical transmitter chip 110A, and the configuration described with respect to FIG. 9 may also apply to the remainder of the receiving waveguides 170A-8, 170A-12, and 170A-16 connected to the optical receiver chip 120A. Moreover, the configurations described with respect to FIGS. 8 and 9 may apply correspondingly to the remainder of the transmitting waveguides 150-1 to 150-16 and optical transmitter chips 110B to 110D and to the remainder of the receiving waveguides 170A-1 to 170D-16 and optical receiver chips 120B to 120D. Thus, each of the optical transmitter chips 110A to 110D and optical receiver chips 120A to 120D may be positioned such that at least one optical transmitter included in the chip (e.g., optical transmitter 110-1) or at least one optical receiver included in the chip (e.g., optical receiver 120-1) faces the board, with the transmitting waveguides 150-1 to 150-16 connected to the optical transmitters 110-1 to 110-16 via the entry mirrors 810 and the receiving waveguides 170A-1 to 170D-16 connected to the optical receivers 120-1 to 120-16 via the exit mirrors 910.

The various waveguides and the combiners 210 of the photonic neural component 100 may be manufactured by forming a lower clad layer in a layer of a board, forming a core layer on the lower clad layer, and forming an upper clad layer on the core layer. The lower and upper clad layers may be formed, for example, by applying a first polymer using spin coating or curtain coating and baking. The lower and upper clad layers may be shared by multiple parallel waveguides. The core layer may be formed, for example, by applying a second or the same polymer using spin coating or curtain coating and baking, wherein a photomask pattern having an opening in a portion to be the core is formed on the second polymer and irradiated with ultraviolet rays to increase the refractive index. The mirrors 140A to 140D, mirrors 160A to 160D, entry mirrors 810, and exit mirrors 910, may be formed during the formation of the waveguides, e.g., by cutting an end portion of the core and forming a reflective surface by vapor deposition of mirror material such as aluminum, silver, etc. or a total internal reflection mechanism may be used.

Figure 10:
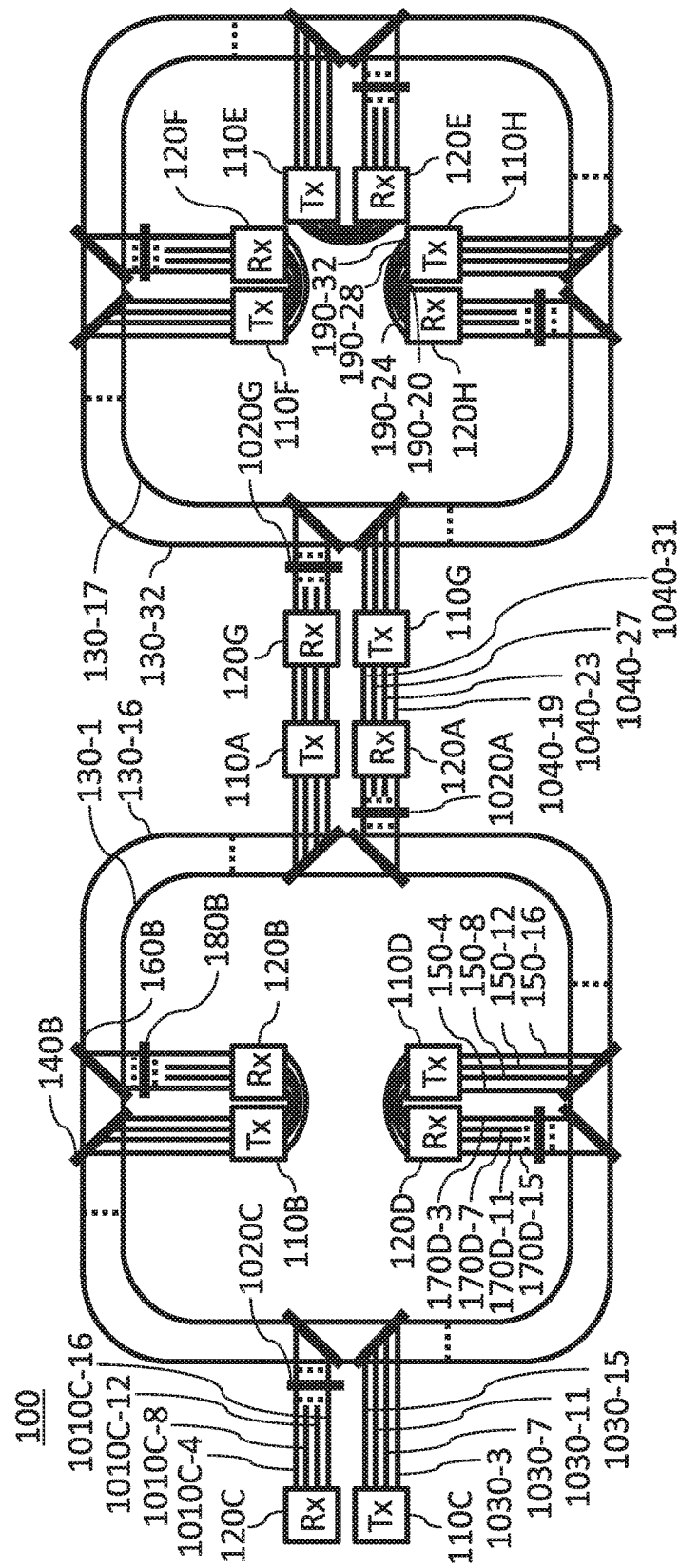
FIG. 10 shows an example schematic of a waveguide architecture for a photonic neural component according to an embodiment of the present invention.

FIG. 10 shows an example diagram of a waveguide architecture for a photonic neural component 100 according to an embodiment of the present invention. The architecture of FIG. 10 is an example of how the architecture of FIG. 1 may be expanded to include more pairs of transmitter and receiver chips, e.g., more neurons. For ease of illustration, out of inter-node waveguides 130-1 to 130-32, only the innermost inter-node waveguides 130-1 and 130-17 and the outermost signal lines 130-16 and 130-32 are shown, with ellipsis in between representing inter-node waveguide 130-2 to 130-15 and inter-node waveguides 130-18 to 130-31. Similarly, except near the respective optical receiver chips 120A to 120H, only a portion of the receiving waveguides 120A-1 to 120H-16 are shown, with ellipsis representing the remaining receiving waveguides as shown in more detail in FIG. 2 above. Due to limited space, out of the plurality of transmitting waveguides 150-2, 150-4, 150-6, 150-8, 150-10, 150-12, 150-14, 150-16, 150-17, 150-18, 150-20, 150-21, 150-22, 150-24, 150-25, 150-26, 150-28, 150-29, 150-30, and 150-32 (e.g., transmitting waveguides 150-1 to 150-32 omitting input waveguides 1030-1, 1030-3, 1030-5, 1030-7, 1030-9, 1030-11, 1030-13, 1030-15, 1030-19, 1030-23, 1030-27, and 1030-31 described below), only transmitting waveguides 150-4, 150-8, 150-12, and 150-16 are given reference numbers in FIG. 10. Similarly, out of the plurality of mirrors 140A to 140H (from-transmitter mirrors) only mirror 140B is given a reference number in FIG. 10, out of the plurality of mirrors 160A to 160H (to-receiver mirrors) only mirror 160B is given a reference number in FIG. 10, out of the plurality of filters 180B, 180D, 180E, 180F, and 180H only filter 180B is given a reference number in FIG. 10, out of the plurality of receiving waveguides 170B-1 to 170B-16, 170D-1 to 170D-16, 170E-17 to 170E-32, 170E-17 to 170E-32, and 170H-17 to 170H-32 only receiving waveguides 170D-3, 170D-7, 170D-11, and 170D-15 are given reference numbers in FIG. 10, and out of the plurality of intra-node signal lines 190-2, 190-4, 190-6, 190-8, 190-10, 190-12, 190-14, 190-16, 190-17, 190-18, 190-20, 190-21, 190-22, 190-24, 190-25, 190-26, 190-28, 190-29, 190-30, and 190-32, only intra-node signal lines 190-20, 190-24, 190-28, and 190-32 are given reference numbers in FIG. 10. Nevertheless, the omitted reference numbers of transmitting waveguides, combiners, mirrors, receiving waveguides, filters, and intra-node signal lines depicted in FIG. 7 may be referred to throughout this disclosure with the understanding that the letter suffixes A through H refer to corresponding optical transmitter chips 110A to 110H and optical receiver chips 120H to 120H and the understanding that the number suffixes-1 through-32 refer to corresponding inter-node waveguides 130-1 to 130-32 in the same ways as described above with respect to FIGS. 1 and 2.

Just as the optical transmitter chips 110A to 110D of FIG. 1 include respective pluralities of optical transmitters 110-1, 110-5, 110-9, 110-13, optical transmitters 110-2, 110-6, 110-10, 110-14, optical transmitters 110-3, 110-7, 110-11, 110-15, and optical transmitters 110-4, 110-8, 110-12, 110-16 corresponding to respectively connected inter-node waveguides 130-1 to 130-16, the optical transmitter chips 110A to 110H of FIG. 10 include respective pluralities of optical transmitters 110-17, 110-21, 110-25, 110-29, optical transmitters 110-18, 110-22, 110-26, 110-30, optical transmitters 110-19, 110-23, 110-27, 110-31, and optical transmitters 110-20, 110-24, 110-28, 110-32 corresponding to respectively connected inter-node waveguides 130-17 to 130-32, but for ease of illustration none of the optical transmitters are shown in FIG. 10. In the same way, just as the optical receiver chips 120A to 120D of FIG. 1 include respective pluralities of optical receivers 120-1, 120-5, 120-9, 120-13, optical receivers 120-2, 120-6, 120-10, 120-14, optical receivers 120-3, 120-7, 120-11, 120-15, and optical receivers 120-4, 120-8, 120-12, 120-16, the optical receiver chips 120A to 120H of FIG. 10 include respective pluralities of optical receiver 120-17, 120-21, 120-25, 120-29, optical receiver 120-18, 120-22, 120-26, 120-30, optical receiver 120-19, 120-23, 120-27, 120-31, and optical receiver 120-20, 120-24, 120-28, 120-32, but for ease of illustration none of the optical receivers are shown in FIG. 10.

In the example of FIG. 1, the plurality of inter-node waveguides 130-1 to 130-16 includes a first ring (e.g., inter-node waveguides 130-1 to 130-16) having two or more of the inter-node waveguides arranged as concentric loops, the plurality of optical transmitters 110-1 to 110-16 includes a first inner optical transmitter group (e.g., optical transmitters 110-1 to 110-16) having two or more of the optical transmitters disposed inside the first ring, and the plurality of optical receivers 120-1 to 120-16 includes a first inner optical receiver group (e.g., optical receivers 120-1 to 120-16) having two or more of the optical receivers disposed inside the first ring. In the example of FIG. 10, similarly to FIG. 1, the plurality of inter-node waveguides 130-1 to 130-32 includes a first ring (e.g., inter-node waveguides 130-1 to 130-16) having two or more of the inter-node waveguides arranged as concentric loops, the plurality of optical transmitters 110-1 to 110-32 includes a first inner optical transmitter group (e.g., optical transmitters 110-2, 110-6, 110-10, and 110-14 of optical transmitter chip 110B and optical transmitters 110-4, 110-8, 110-12, and 110-16 of optical transmitter chip 110D) having two or more of the optical transmitters disposed inside the first ring, and the plurality of optical receivers 120-1 to 120-32 includes a first inner optical receiver group (e.g., optical receivers 120-2, 120-6, 120-10, and 120-14 of optical receiver chip 120B and optical receivers 120-4, 120-8, 120-12, and 120-16 of optical receiver chip 120D) having two or more of the optical receivers disposed inside the first ring. The plurality of optical transmitters 110-1 to 110-32 may further include a first outer optical transmitter group (e.g., optical transmitters 110-1, 110-5, 110-9, and 110-13 of optical transmitter chip 110A and optical transmitters 110-3, 110-7, 110-11, and 110-15 of optical transmitter chip 110C) having two or more of the optical transmitters disposed outside the first ring, and the plurality of optical receivers 120-1 to 120-32 may further include a first outer optical receiver group (e.g., optical receivers 120-1, 120-5, 120-9, and 120-13 of optical receiver chip 120A and optical receivers 120-3, 120-7, 120-11, and 120-15 of optical receiver chip 120C) having two or more of the optical receivers disposed outside the first ring.

As shown in FIG. 10, the plurality of inter-node waveguides 130-1 to 130-32 may further include a second ring (e.g., inter-node waveguides 130-17 to 130-32) having two or more of the inter-node waveguides arranged as concentric loops, the plurality of optical transmitters 110-1 to 110-32 includes a second inner optical transmitter group (e.g., optical transmitters 110-17, 110-21, 110-25, and 110-29 of optical transmitter chip 110E, optical transmitters 110-18, 110-22, 110-26, and 110-30 of optical transmitter chip 110F and optical transmitters 110-20, 110-24, 110-28, and 110-32 of optical transmitter chip 110H) having two or more of the optical transmitters disposed inside the second ring, and the plurality of optical receivers 120-1 to 120-32 includes a second inner optical receiver group (e.g., optical receivers 120-17, 120-21, 120-25, and 120-29 of optical receiver chip 120E, optical receivers 120-18, 120-22, 120-26, and 120-30 of optical receiver chip 120F and optical receivers 120-20, 120-24, 120-28, and 120-32 of optical receiver chip 120H) having two or more of the optical receivers disposed inside the second ring. The plurality of optical transmitters 110-1 to 110-32 may further include a second outer optical transmitter group (e.g., optical transmitters 110-19, 110-23, 110-27, and 110-31 of optical transmitter chip 110G) having two or more of the optical transmitters disposed outside the second ring, and the plurality of optical receivers 120-1 to 120-32 may further include a second outer optical receiver group (e.g., optical receivers 120-19, 110-23, 110-27, and 110-31 of optical receiver chip 120G) having two or more of the optical receivers disposed outside the second ring.

As described above, the plurality of inter-node waveguides 130-1 to 130-32 may be divided into multiple rings (e.g., the first ring having inter-node waveguides 130-1 to 130-16 and the second ring having inter-node waveguides 130-17 to 130-32), while the optical transmitters and optical receivers (and equally the optical transmitter chips and optical receiver chips) can be divided into inner and outer groups associated with each ring. In the same way, the plurality of mirrors 140A to 140H (from-transmitter mirrors) may include a first from-transmitter mirror group (e.g., mirrors 140A to 140D), each mirror of the first from-transmitter mirror group arranged to reflect an optical signal onto an inter-node waveguide of the first ring (e.g., inter-node waveguides 130-1 to 130-16, and a second from-transmitter mirror group (e.g., mirrors 140E to 140H), each minor of the second from-transmitter mirror group arranged to reflect an optical signal onto an inter-node waveguide of the second ring (e.g., inter-node waveguides 130-17 to 130-32). Likewise, the plurality of mirrors 160A to 160H (to-receiver mirrors) may include a first mirror group (e.g., mirrors 160A to 160D), each mirror of the first mirror group arranged to partially reflect an optical signal propagating on an inter-node waveguide of the first ring (e.g., inter-node waveguides 130-1 to 130-16) to produce a reflected optical signal, and a second mirror group (e.g., mirrors 160E to 160H), each mirror of the second mirror group arranged to partially reflect an optical signal propagating on an inter-node waveguide of the second ring (e.g., inter-node waveguides 130-17 to 130-32) to produce a reflected optical signal. The filters 180B, 180D, 180E, 180F, and 180H and the intra-node signal lines 190-2, 190-4, 190-6, 190-8, 190-10, 190-12, 190-14, 190-16, 190-17, 190-18, 190-20, 190-21, 190-22, 190-24, 190-25, 190-26, 190-28, 190-29, 190-30, and 190-32 may similarly be divided into groups associated with each ring.

In place of receiving waveguides 170A-1 to 170A-16, 170C-1 to 170C-16, and 170G-17 to 170G-32, the waveguide architecture of FIG. 10 instead includes output waveguides 1010A-1 to 1010A-16, 1010C-1 to 1010C-16, and 1010G-17 to 1010G-32, divided into first output waveguides 1010A-1 to 1010A-16 and 1010C-1 to 1010C-16 associated with the first ring and second output waveguides 1010G-17 to 1010G-32 associated with the second ring. (Due to limited space, only output waveguides 1010C-4, 1010C-8, 1010C-12, and 1010C-16 are given reference numbers in FIG. 10.) The first output waveguides 1010A-1 to 1010A-16 and 1010C-1 to 1010C-16 may be formed on the board such that at least one of the first output waveguides (e.g., first output waveguide 1010C-14) crosses at least one of the inter-node waveguides of the first ring (e.g., inter-node waveguide 130-16) with a core of one of the crossing waveguides passing through a core or a clad of the other. Each first output waveguide (e.g., 1010C-14) may be connected to outside the first ring and configured to receive a reflected optical signal produced by a mirror of the first mirror group (e.g., mirror 160C) and transmit the reflected optical signal to outside the first ring. Similarly, the second output waveguides 1010G-17 to 1010G-32 may be formed on the board such that at least one of the second output waveguides (e.g., second output waveguide 1010G-30) crosses at least one of the inter-node waveguides of the second ring (e.g., inter-node waveguide 130-32) with a core of one of the crossing waveguides passing through a core or a clad of the other. Each second output waveguide (e.g., 1010G-30) may be connected to outside the second ring and configured to receive a reflected optical signal produced by a mirror of the second mirror group (e.g., mirror 160G) and transmit the reflected optical signal to outside the second ring.

In place of filters 180A, 180C, and 180G, the waveguide architecture of FIG. 10 instead includes output filters 1020A, 1020C, and 1020G, divided into first output filters 1020A and 1020C associated with the first ring and a second output waveguide 1020G associated with the second ring. The first output filter 1020A is formed on the board and configured to apply a weight to a reflected optical signal produced by a mirror 160A of the plurality of mirrors before the reflected optical signal is transmitted to outside the first ring by the first output waveguide (e.g., first output waveguide 1010A-1 to 1010A-16) that receives the reflected optical signal. Similarly, the first output filter 1020C is formed on the board and configured to apply a weight to a reflected optical signal produced by a mirror 160C of the plurality of mirrors before the reflected optical signal is transmitted to outside the first ring by the first output waveguide (e.g., first output waveguide 1010C-1 to 101C-16) that receives the reflected optical signal. Correspondingly, the second output filter 1020G is formed on the board and configured to apply a weight to a reflected optical signal produced by a mirror 160G of the plurality of mirrors before the reflected optical signal is transmitted to outside the second ring by the first output waveguide (e.g., first output waveguide 1010G-17 to 101G-32) that receives the reflected optical signal.

Each of the optical receivers of the first outer optical receiver group (e.g., optical receiver 120-1, 120-5, 120-9, or 120-13 of optical receiver chip 120A or optical receiver 120-3, 120-7, 120-11, or 120-15 of optical receiver chip 120C) may be optically connected to a first output waveguide of the plurality of first output waveguides (e.g., 1010A-1 to 1010A-16 and 1010C-1 to 1010C-16) and configured to receive the reflected optical signal transmitted by the first output waveguide. Similarly, each of the optical receivers of the second outer optical receiver group (e.g., optical receivers 120-19, 110-23, 110-27, and 110-31 of optical receiver chip 120G) may be optically connected to a second output waveguide of the plurality of second output waveguides (e.g., second output waveguides 1010G-17 to 1010G-32) and configured to receive the reflected optical signal transmitted by the second output waveguide. That is, each second output waveguide (e.g., second output waveguides 1010G-17 to 1010G-32) may be optically connected to an optical receiver of the second outer optical receiver group (e.g., optical receivers 120-19, 110-23, 110-27, and 110-31 of optical receiver chip 120G) and configured to receive a reflected optical signal produced by a mirror of the second mirror group (e.g., mirror 160G) and transmit the reflected optical signal to the optical receiver. In some embodiments, one or more optical receivers of the first outer optical receiver group (e.g., optical receiver 120-1, 120-5, 120-9, or 120-13 of optical receiver chip 120A or optical receiver 120-3, 120-7, 120-11, or 120-15 of optical receiver chip 120C) or the second outer optical receiver group (e.g., optical receivers 120-19, 110-23, 110-27, and 110-31 of optical receiver chip 120G) may serve in this way as an output of a neural network including the photonic neural component 100. For example, in a case where the waveguide architecture shown in FIG. 10 represents a photonic neural component 100 that is a complete neural network, the optical receiver chip 120C may server as an output of the neural network.

In place of transmitting waveguides 150-1, 150-3, 150-5, 150-7, 150-9, 150-11, 150-13, 150-15, 150-19, 150-23, 150-27, and 150-31, the waveguide architecture of FIG. 10 instead includes input waveguides 1030-1, 1030-3, 1030-5, 1030-7, 1030-9, 1030-11, 1030-13, 1030-15, 1030-19, 1030-23, 1030-27, and 1030-31, divided into first input waveguides 1030-1, 1030-3, 1030-5, 1030-7, 1030-9, 1030-11, 1030-13, and 1030-15 associated with the first ring and second input waveguides 1030-19, 1030-23, 1030-27, and 1030-31 associated with the second ring. (Due to limited space, only input waveguides 1030-3, 1030-7, 1030-11, and 1030-15 are given reference numbers in FIG. 10.) The first input waveguides 1030-1, 1030-3, 1030-5, 1030-7, 1030-9, 1030-11, 1030-13, and 1030-15 may be formed on the board such that at least one of the first input waveguides (e.g., first input waveguide 1030-11) crosses at least one of the inter-node waveguides of the first ring (e.g., inter-node waveguide 130-15) with a core of one of the crossing waveguides passing through a core or a clad of the other. Each first input waveguide (e.g., 1030-11) may be connected to outside the first ring and configured to receive an optical signal from outside the first ring and transmit the received optical signal to an inter-node waveguide of the first ring (e.g., 130-11). Similarly, the second input waveguides 1030-19, 1030-23, 1030-27, and 1030-31 may be formed on the board such that at least one of the second input waveguides (e.g., second input waveguide 1030-27) crosses at least one of the inter-node waveguides of the second ring (e.g., inter-node waveguide 130-32) with a core of one of the crossing waveguides passing through a core or a clad of the other. Each second input waveguide (e.g., 1030-27) may be connected to outside the second ring and configured to receive an optical signal from outside the second ring and transmit the received optical signal to an inter-node waveguide of the second ring (e.g., 130-27).

Each of the optical transmitters of the first outer optical transmitter group (e.g., optical transmitters 110-1, 110-5, 110-9, and 110-13 of optical transmitter chip 110A and optical transmitters 110-3, 110-7, 110-11, and 110-15 of optical transmitter chip 110C) may be optically connected to a first input waveguide of the plurality of first input waveguides (e.g., 1030-1, 1030-3, 1030-5, 1030-7, 1030-9, 1030-11, 1030-13, and 1030-15) and configured to emit an optical signal to be transmitted by the first input waveguide. Similarly, each of the optical transmitters of the second outer optical transmitter group (e.g., optical transmitters 110-19, 110-23, 110-27, and 110-31 of optical transmitter chip 110G) may be optically connected to a second input waveguide of the plurality of second input waveguides (e.g., second input waveguides 1030-19, 1030-23, 1030-27, and 1030-31) and configured to emit an optical signal to be transmitted by the first input waveguide. That is, each second input waveguide (e.g., second input waveguide 1030-19, 1030-23, 1030-27, or 1030-31) may be optically connected to an optical transmitter of the second outer optical transmitter group (e.g., optical transmitter 110-19, 110-23, 110-27, or 110-31 of optical transmitter chip 110G) and configured to receive an optical signal emitted from the optical transmitter and transmit the received optical signal to an inter-node waveguide of the second ring (e.g., inter-node waveguide 130-19, 130-23, 130-27, or 130-31). In some embodiments, one or more optical transmitters of the first outer optical transmitter group (e.g., optical transmitters 110-1, 110-5, 110-9, and 110-13 of optical transmitter chip 110A and optical transmitters 110-3, 110-7, 110-11, and 110-15 of optical transmitter chip 110C) or the second outer optical transmitter group (e.g., optical transmitters 110-19, 110-23, 110-27, or 110-31 of optical transmitter chip 110G) may serve in this way as an input of a neural network including the photonic neural component 100. For example, in a case where the waveguide architecture shown in FIG. 10 represents a photonic neural component 100 that is a complete neural network, the optical transmitter chip 110C may server as an input of the neural network.

In place of intra-node signal lines 190-1, 190-3, 190-5, 190-7, 190-9, 190-11, 190-13, 190-15, 190-19, 190-23, 190-27, and 190-31, the waveguide architecture of FIG. 10 instead includes inter-ring intra-node signal lines 1040-19, 1040-23, 1040-27, and 1040-31 and 1040-1, 1040-5, 1040-9, and 1040-13, signal lines connected to transmitter chip 110C and receiver chip 120C having been completely omitted in this example to provide an example of inputs and outputs of a neural network as described above. (Due to limited space, only inter-ring intra-node signal lines 1040-19, 1040-23, 1040-27, and 1040-31 are given reference numbers in FIG. 10. Note that, by arbitrary convention, the number suffixes-19, -23, -27, and -31 refer to corresponding inter-node waveguides 130-19, 130-23, 130-27, and 130-31 of the ring of the transmitter chip.) Each inter-ring intra-node signal line (e.g., inter-ring intra-node signal line 1040-19) may be connected to an optical receiver of the first outer optical receiver group (e.g., optical receiver 120A) and an optical transmitter of the second outer optical transmitter group (e.g., optical transmitter 110G) and configured to receive an electrical signal representing a power of an optical signal received by the optical receiver and transmit the electrical signal to the optical transmitter, thereby connecting the optical receiver and the optical transmitter to form an input and an output of a neuron. Similarly, each inter-ring intra-node signal line (e.g., inter-ring intra-node signal line 1040-1) may be connected to an optical transmitter of the first outer optical receiver group (e.g., optical transmitter 110A) and an optical receiver of the second outer optical receiver group (e.g., optical receiver 120G) and configured to receive an electrical signal representing a power of an optical signal received by the optical receiver and transmit the electrical signal to the optical transmitter, thereby connecting the optical receiver and the optical transmitter to form an input and an output of a neuron. In other words, by the use of inter-ring intra-node signal lines, optical receivers of the first ring may be connected to optical transmitters of the second ring and optical receivers of the second ring may be connected to optical transmitters of the first ring, thereby forming inter-ring nodes that may function as neurons connecting the rings. In this way, an arbitrary number of transmitters and receivers may be assembled across an arbitrary number of rings to scale the photonic neural component 100 or a neural network comprising the photonic neural component 100. Such scaling can include assembling rings into an arbitrary number of larger, higher-order rings or other structures, which may themselves be assembled into even larger, higher-order rings or other structures, and so on, to form a super-loop or super-ring. For example, if the two rings shown in FIG. 10 are regarded as first-order rings, a series of such first-order rings can be connected in a row that bends in on itself to form a larger second-order ring. Such second-order ring may then be connected to other second-order rings in the same way and so on. All such connections can be accomplished, for example, by input and output waveguides as shown in FIG. 10.

Figure 11:
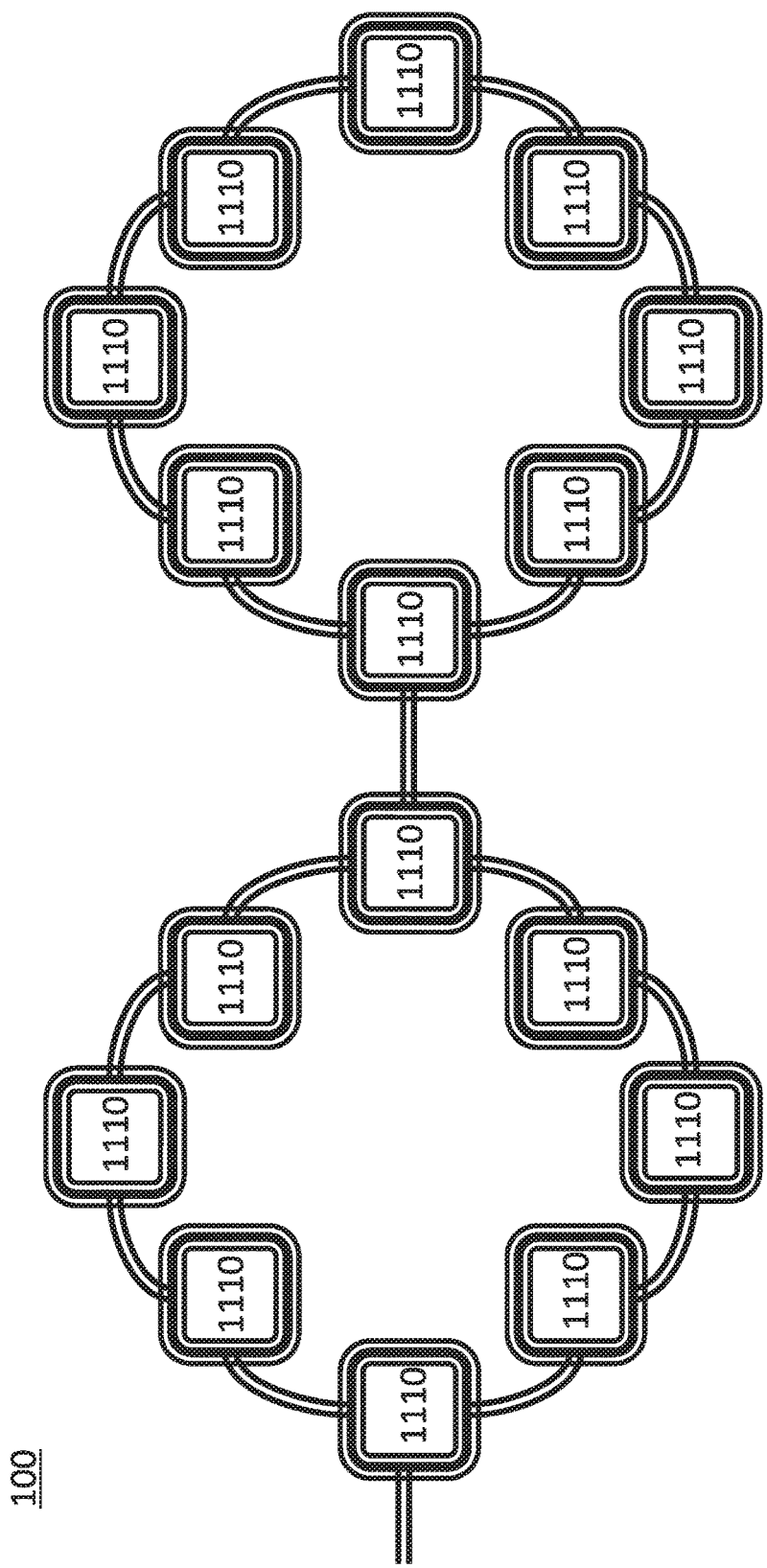
FIG. 11 shows an example schematic of a waveguide architecture for a photonic neural component according to an embodiment of the present invention.

FIG. 11 shows an example diagram of a waveguide architecture for a photonic neural component 100 according to an embodiment of the invention. In FIG. 11, a first plurality of first-order rings 1110 are connected in a row that bends in on itself to form a larger second-order ring, represented by the large ring including eight first-order rings 1110 on the left-hand side of the figure. A second plurality of first-order rings 1110 are connected in a similar row that bends in on itself to form a larger second-order ring, represented by the large ring including eight first-order rings 1110 on the right-hand side of the figure. Connections (shown as double-lines) are shown between the first-order rings 1110, including one example connection connecting the two second-order rings. Each of the first-order rings 1110 having two connections may be structured as the first (left-most) ring of FIG. 10, while each of the first-order rings 1110 having three connections may be structured similarly to the first (left-most) ring of FIG. 10 but with an additional pair of transmitter chip 110 and receiver chip 120 moved from the inner group (containing chips 110/120 B and D in FIG. 10) to the outer group (containing chips 110/120 A and C in FIG. 10). Each of the connections in FIG. 11 thus may contain waveguides and outer transmitter/receiver chip pairs of each of the connected first-order rings 1110, similar to the transmitter/receiver chips 110/120 A and G in FIG. 10. The left-most protruding connection in FIG. 11 may serve as input/output for the pair of second-order rings shown in FIG. 11 (similar to the transmitter/receiver chips 110/120C and connected waveguides in FIG. 10). The second-order rings of FIG. 11 may be connected into third-order or higher rings to scale the photonic neural component 100 or a neural network comprising the photonic neural component 100.

In the above description, the output waveguides (e.g., 1010C-4), input waveguides (e.g., 1030-3), and inter-ring intra-node signal lines (e.g., 1040-19) are referred to by different names than the receiving waveguides (e.g., 170D-3), transmitting waveguides (e.g., 150-4), and intra-node signal lines (e.g., 190-20), respectively. However, apart from their relationship with the first and second rings, the output waveguides, input waveguides, and inter-ring intra-node signal lines may be regarded as examples of receiving waveguides, transmitting waveguides, and intra-node signal lines, respectively, and may have the same respective structures. Therefore, throughout this disclosure, any description of receiving waveguides, transmitting waveguides, and intra-node signal lines may apply equally to output waveguides, input waveguides, and inter-ring intra-node signal lines, respectively.

As noted above, the inter-node waveguides 130-1 to 130-32 may be dedicated to optical transmitters. As shown by the reference numbers used throughout this disclosure, inter-node waveguides associated with the same-positioned optical transmitter of each optical transmitter chip (e.g., inter-node waveguides of the same channel), for example inter-node waveguides 130-1 and 130-2 (associated respectively with optical transmitter 110-1 of optical transmitter chip 110A and optical transmitter 110-2 of optical transmitter chip 110B) may be arranged adjacently in the fine pitch structure. Alternatively, inter-node waveguides associated with differential pairs of transmitters (e.g., optical transmitters 110-1 and 110-5) may be arranged adjacently in the fine pitch structure. Or, as another alternative, inter-node waveguides associated with all of the optical transmitters of each optical transmitter chip (e.g., optical transmitters 110-1, 110-5, 110-9, and 110-13) may be arranged adjacently in the fine pitch structure. With these latter two alternatives, it is possible to reduce the number of separate mirror elements in each of the mirrors 140A-H and/or the mirrors 160A-H.

In FIGS. 1, 3-6, 10, and 11 and throughout this description, reference is made to a photonic neural component 100. The term "photonic neural component" and the corresponding reference number "100" in the drawings may refer to any component or combination of components of the waveguide architecture described throughout this disclosure, e.g., the entirety of FIG. 1, 3-6, 10, or 11, a portion of FIG. 1, 3-6, 10, or 11, a variation and/or expansion of FIG. 1, 3-6, 10, or 11, or any portion, variation, and/or expansion of any embodiment of the waveguide architecture described in this disclosure and not specifically depicted in the drawings, including an entire neural network. A photonic neural component 100 or neural network may also include or be connected to some means of adjusting the power of the emitted optical signals of the optical transmitters and/or the sensitivity of the optical receivers, in order to adjust the balance of the neural network. Adjustment parameters can be stored in a memory. Such means may include, for example, a computer connected to the photonic neural component 100 or neural network. Such a computer may further provide any practical functionality of the photonic neural component 100 or neural network, e.g., running a computer program that uses neural computing at least in part or cooperates with neural computing, varying the weights of the filters 180 (including output filters 1020), varying reflection coefficients of the mirrors 160, issuing requests to emit optical signals from the optical transmitters, e.g., initial optical signals having instructed power, monitoring and reading the power of optical signals received by the optical receivers and returning the values to a computer program, etc. The computer may, for example, check that the same power level can be measured at all optical receivers when optical signals having the same power are instructed to be emitted by the optical transmitters and the same weights are set to all filters, and the computer may make adjustments accordingly.

As can be understood from this disclosure, the features of the photonic neural component 100 and related embodiments make it possible to avoid the drawbacks associated with conventional techniques. Using the waveguide architecture shown and described herein, a photonic neural component 100 can support photonic spike computing by optical signal transmission with low loss via waveguides formed so as to cross one another on a board, e.g., a printed circuit board. The disclosed waveguide architecture can therefore allow for design flexibility (e.g., layout, materials, etc.) while lifting the speed restriction of the conventional electronic approach.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

What is claimed is:

1. A photonic neural component comprising:
   inter-node waveguides configured to propagate optical signals;
   first waveguides optically coupled to the inter-node waveguides, at least one first waveguide optically intersecting at least one inter-node waveguide; and
   second waveguides optically coupled to the inter-node waveguides, at least one second waveguide optically intersecting at least one inter-node waveguide, each second waveguide being configured to propagate a partially reflected optical signal from the optical signals propagated by the inter-node waveguides.

2. The photonic neural component of claim 1, further comprising an optical filter intersecting an optical path of an optical signal of the optical signals.

3. The photonic neural component of claim 1, further comprising combiners configured to optically combine reflected optical signals propagated on at least two of the second waveguides after the weightings have been applied by the optical filter filters.

4. The photonic neural component of claim 1, further comprising:
   optical transmitters coupled to the first waveguides and configured to emit an optical signal and transmit the optical signal in the first waveguides; and
   optical receivers coupled to the second waveguides and configured to receive reflected optical signals.

5. The photonic neural component of claim 1, further comprising:
   a subset of the second waveguides configured as output waveguides, at least one output waveguide optically intersecting at least one of the inter-node waveguides, the output waveguides being configured to receive the output optical signals; and
   a subset of the first waveguides configured as input waveguides, at least one input waveguide optically intersecting at least one of the inter-node waveguides, the input waveguides being configured to transmit input optical signals to the inter-node waveguides.

6. The photonic neural component of claim 2, wherein the optical filter includes neutral density filters.

7. The photonic neural component of claim 2, wherein the optical filter includes exchangeable filters that can be exchanged to change the weightings.

8. The photonic neural component of claim 2, wherein the optical filter includes variable filters whose transparency can be varied to change the weightings.

9. The photonic neural component of claim 3, wherein the combiners includes at least one combiner having a y-shaped waveguide structure having a first entrance arm optically coupled to a first one of the second waveguides, a second entrance arm optically coupled to a second one of the second waveguides, and an exit arm common to the first entrance arm and the second entrance arm, the at least one combiner configured to receive, as input optical signals, a first and second reflected optical signal of the reflected optical signals such that the input optical signals are combined at the exit arm of the y-shaped waveguide structure.

10. The photonic neural component of claim 5, wherein the input waveguides are configured to optically couple with output waveguides of other photonic neural components, and the output waveguides are configured to optically couple with input waveguides of other photonic neural components.

11. The photonic neural component of claim 5, wherein the input optical signal corresponds to an output optical signal of another photonic neural component, and the output optical signal corresponds to an input optical signal of another photonic neural component.

12. The photonic neural component of claim 9, wherein each optical transmitter is paired with a respective optical receiver, the paired optical transmitter and paired optical receiver being electrically coupled, and where the paired optical receiver is configured to transmit to the paired optical transmitter an electrical signal representing a power of the reflected optical signal received by the paired optical receiver.

13. A photonic neural component comprising:
inter-node waveguides configured to propagate optical signals;
first waveguides optically coupled to the inter-node waveguides, at least one first waveguide optically intersecting at least one inter-node waveguide;
second waveguides optically coupled to the inter-node waveguides, at least one second waveguide optically intersecting at least one inter-node waveguide, each second waveguide being configured to propagate a partially reflected optical signal from the optical signals propagated by the inter-node waveguides;
output waveguides optically coupled to the inter-node waveguides and configured to output the partially reflected optical signals, where at least one output waveguide optically intersects at least one inter-node waveguide; and
input waveguides optically coupled to the inter-node waveguides and configured to introduce an optical signal from an external source to the inter-node waveguides, where at least one input waveguide optically intersects at least one inter-node waveguide.

14. The photonic neural component of claim 13, further comprising an optical filter intersecting an optical path of an optical signal of the optical signals.

15. The photonic neural component of claim 13, further comprising combiners configured to optically combine reflected optical signals propagated on at least two of the second waveguides after the weightings have been applied by the optical filter filters.

16. The photonic neural component of claim 13, further comprising:
optical transmitters coupled to the first waveguides and configured to emit an optical signal and transmit the optical signal in the first waveguides; and
optical receivers coupled to the second waveguides and configured to receive reflected optical signals,
wherein each optical transmitter is paired with a respective optical receiver, the paired optical transmitter and paired optical receiver being electrically coupled, and wherein the paired optical receiver is configured to transmit to the paired optical transmitter an electrical signal representing a power of the reflected optical signal received by the paired optical receiver.

17. The photonic neural component of claim 14, wherein the optical filters include neutral density filters.

18. The photonic neural component of claim 14, wherein the optical filters include exchangeable filters that can be exchanged to change the weightings.

19. The photonic neural component of claim 14, wherein the optical filters include variable filters whose transparency can be varied to change the weightings.

20. A photonic neural component comprising:
inter-nodal waveguides optically coupled to first waveguides and second waveguides, the inter-nodal waveguides being configured to propagate optical signals transmitted by the first waveguides and partially reflected to the second waveguides;
output waveguides optically coupled to the inter-node waveguides and configured to output the propagated optical signals as output optical signals, where at least one output waveguide optically intersects at least one inter-node waveguide; and
input waveguides optically coupled to the inter-node waveguides and configured to introduce optical signals from an external source, as input optical signals, to the inter-node waveguides, where at least one input waveguide optically intersects at least one inter-node waveguide.

* * * * *